US009237238B2

(12) United States Patent
Chu et al.

(10) Patent No.: US 9,237,238 B2
(45) Date of Patent: Jan. 12, 2016

(54) SPEECH-SELECTIVE AUDIO MIXING FOR CONFERENCE

(71) Applicant: Polycom, Inc., San Jose, CA (US)

(72) Inventors: Peter L. Chu, Lexington, MA (US); Yibo Liu, Reading, MA (US); Uri Avni, Moshay Ram-On (IL); Ami Noy, Nir-Galim (IL)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 14/339,244

(22) Filed: Jul. 23, 2014

(65) Prior Publication Data

US 2015/0030149 A1    Jan. 29, 2015

Related U.S. Application Data

(60) Provisional application No. 61/859,071, filed on Jul. 26, 2013, provisional application No. 61/877,191, filed on Sep. 12, 2013.

(51) Int. Cl.
| H04M 3/42 | (2006.01) |
| H04M 11/00 | (2006.01) |
| H04M 1/00 | (2006.01) |
| H04L 12/16 | (2006.01) |
| H04Q 11/00 | (2006.01) |
| H04M 3/56 | (2006.01) |

(52) U.S. Cl.
CPC .............. *H04M 3/568* (2013.01); *H04M 3/56* (2013.01); *H04M 2201/14* (2013.01)

(58) Field of Classification Search
CPC ............. H04M 2203/2072; H04M 2203/2094; H04M 2203/5054; H04M 3/42; H04M 3/42221; H04M 3/44246; H04M 3/42348; H04M 3/56; H04M 3/562; H04M 3/563; H04M 3/564; H04M 3/565; H04M 3/566; H04M 3/567; H04M 3/568; H04M 7/006; H04M 7/15; H04M 7/146; H04L 12/18; H04L 12/1813; H04L 12/581; H04L 65/403; H04L 67/24
USPC ................ 379/90.01, 93.01, 93.21, 157, 158, 379/201.01, 202.01, 207.01; 370/259, 260, 370/261, 262; 455/414.1, 416
See application file for complete search history.

(56) References Cited

U.S. PATENT DOCUMENTS

| 5,436,896 | A | * | 7/1995 | Anderson et al. | 370/260 |
| 5,454,041 | A | * | 9/1995 | Davis | 381/119 |
| 5,768,263 | A | | 6/1998 | Tischler et al. | |
| 5,991,277 | A | | 11/1999 | Maeng et al. | |
| 6,137,887 | A | * | 10/2000 | Anderson | 381/92 |
| 6,141,597 | A | | 10/2000 | Botzko et al. | |
| 6,327,276 | B1 | * | 12/2001 | Robert et al. | 370/535 |
| 6,408,327 | B1 | * | 6/2002 | McClennon et al. | 709/204 |
| 6,453,285 | B1 | | 9/2002 | Anderson et al. | |

(Continued)

*Primary Examiner* — Khai N Nguyen
(74) *Attorney, Agent, or Firm* — Blank Rome, LLP

(57) ABSTRACT

A conference apparatus reduces or eliminates noise in audio for endpoints in a conference. Endpoints in the conference are designated as a primary talker and as secondary talkers. Audio for the endpoints is processed with speech detectors to characterize the audio as speech or not and to determine energy levels of the audio. As the audio is written to buffers and then read from the buffers, decisions for the gain settings of faders for read audio of the endpoints being combined in the speech selective mix. In addition, the conference apparatus can mitigate the effects of a possible speech collision that may occur during the conference between endpoints.

33 Claims, 12 Drawing Sheets

(56) References Cited

U.S. PATENT DOCUMENTS

| | | |
|---|---|---|
| 6,950,119 B2 | 9/2005 | Kakii et al. |
| 6,956,848 B1 * | 10/2005 | Keung et al. .................. 370/356 |
| 7,308,092 B1 * | 12/2007 | Sun et al. .................. 379/211.02 |
| 7,978,838 B2 | 7/2011 | Rodman et al. |
| 2002/0123895 A1 * | 9/2002 | Potekhin et al. .............. 704/275 |
| 2003/0223562 A1 | 12/2003 | Cui et al. |
| 2005/0213731 A1 | 9/2005 | Rodman et al. |
| 2005/0280701 A1 | 12/2005 | Wardell |
| 2007/0147627 A1 * | 6/2007 | Pocino et al. ................ 381/71.1 |
| 2007/0230372 A1 | 10/2007 | He et al. |
| 2008/0037749 A1 * | 2/2008 | Metzger et al. .......... 379/202.01 |
| 2008/0292081 A1 * | 11/2008 | Brannon et al. ......... 379/202.01 |
| 2009/0168984 A1 | 7/2009 | Kreiner et al. |
| 2009/0220064 A1 | 9/2009 | Gorti et al. |
| 2009/0304197 A1 * | 12/2009 | Joiner et al. .................... 381/66 |
| 2009/0304206 A1 * | 12/2009 | Joiner et al. .................. 381/119 |
| 2009/0307383 A1 * | 12/2009 | Joiner et al. .................... 710/16 |
| 2011/0099485 A1 * | 4/2011 | Alcorn et al. ................ 715/753 |
| 2011/0187814 A1 | 8/2011 | Nimri et al. |
| 2012/0265524 A1 * | 10/2012 | McGowan .................... 704/211 |
| 2012/0290305 A1 | 11/2012 | Feng et al. |
| 2013/0058490 A1 * | 3/2013 | Balakrishnan et al. ......... 381/58 |
| 2014/0071978 A1 * | 3/2014 | Hubner et al. ................ 370/352 |
| 2015/0012266 A1 * | 1/2015 | Spittle et al. ................. 704/206 |

* cited by examiner

SPEECH-SELECTIVE AUDIO MIXING FOR CONFERENCE

CROSS-REFERENCE TO RELATED APPLICATIONS

This application claims the benefit of U.S. Prov. Appl. 61/859,071, filed 26 Jul. 2013 and U.S. Prov. Appl. 61/877,191, filed 12 Sep. 2013, which are incorporated herein by reference.

FIELD OF THE DISCLOSURE

The subject matter of the present disclosure relates to handling audio in a conferencing session and more particularly to a method and apparatus for reducing the interference from noise and speech collisions that may disrupt a conference, such as an audio conference or a videoconference.

BACKGROUND OF THE DISCLOSURE

Various noises may occur during a telephone or video conference. Some of the noises may be impulsive noises, such as ticks or pops having very short duration. Other noises may be constant noises, such as the sound from an airconditioning unit. Conference participants may also create various noises by typing on a computer keyboard, eating, shuffling papers, whispering, tapping a table with a pen, or the like.

When many endpoints participate in a multi-way video/audio conference via a bridge, random noises (such as keyboard typing, paper rustling, and the like) are a constant source of irritation. Typically, the primary talker asks all other endpoints to mute their microphones, which solves the issue of the random noise interference. However, when a talker at a muted endpoint wishes to then talk, the mute button must be un-muted. Quite often, the new talker forgets to un-mute before actually speaking. Moreover, when a current talker finishes talking, the talker must remember to actuate the mute button once again, and similarly the talker often forgets. Additionally, quick muting and un-muting from one talker to another during the conference can in itself be disruptive and undesirable.

Occasionally during a conference, two or more conferees accidentally start talking almost simultaneously, interrupting each other and creating a speech collision. Usually, such a speech collision is followed by a few moments of silence from both conferees. Then, each one gently signals to the other to proceed, encouraging each other to continue speaking. This leads to the conferees to both restart talking simultaneously, creating a chain of speech collisions and embarrassing moments for both sides.

Therefore, there is a need for automatic handling of noise and speech collisions in a conference.

SUMMARY OF THE DISCLOSURE

A conference apparatus reduces or eliminates noise in audio for endpoints in a conference. To do this, endpoints in the conference are designated as a primary talker and as secondary talkers. Audio for the endpoints is processed with speech detectors to characterize the audio as being speech or not and to determine energy levels of the audio. As the audio is written to buffers and then read from the buffers, decisions for the gain settings of faders are made for the audio of the endpoints being combined in the speech selective mix based on the talker designations, speech detection, and audio energy levels. In addition to reducing noise, the conference apparatus can mitigate the effects of possible speech collisions that may occur during the conference between endpoints.

Embodiments of the present disclosure can be implemented by an intermediate node, such as one or more servers, a multipoint control unit (MCU), or a conferencing bridge, that is located between a plurality of endpoints that participate in a video/audio conference.

DETAILED DESCRIPTION

A. Conferencing System

Figure 1:
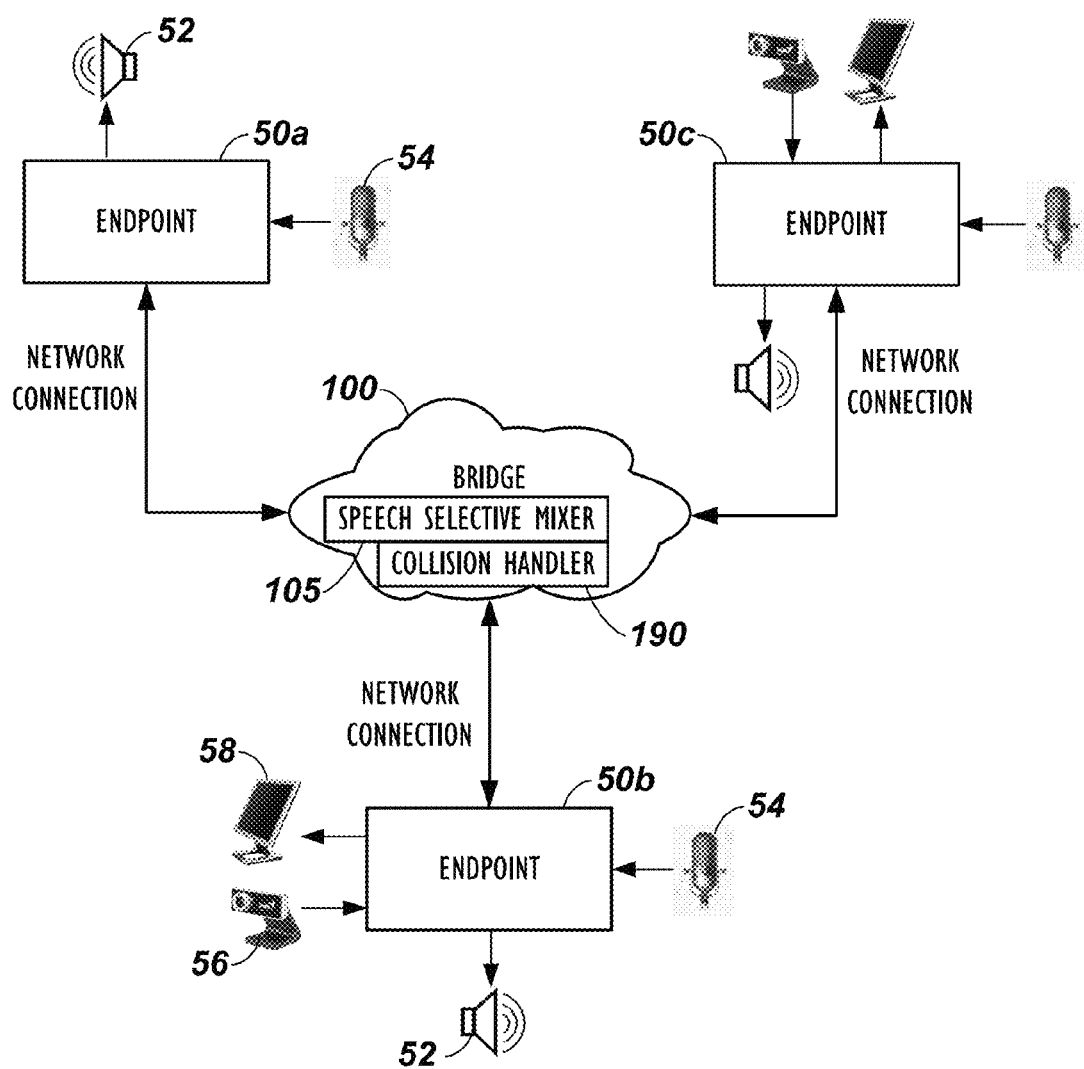
FIG. 1 illustrates an arrangement of a conferencing system according to certain teachings of the present disclosure.

A conferencing system 10 illustrated in FIG. 1 includes a conference bridge 100 connecting a plurality of endpoints 50a-c together in a conference. The system 10 can be a telephone conferencing system, a videoconferencing system, a desktop conferencing system, or other type known in the art. The endpoints 50a-c can be videoconferencing units, speakerphones, desktop videoconferencing units, etc. In the arrangement of FIG. 1, for example, the endpoint 50a can be a speakerphone having a loudspeaker 52 and a microphone 54. Alternatively, the endpoints 50b-c can be videoconferencing units having a loudspeaker 52, a microphone 54, a camera 56, and a display 58.

The conference bridge 100 can generally include one or more servers, multipoint control units, or the like, and the endpoints 50a-c can connect to the bridge 100 using any of a number of types of network connections, such as an Ethernet connection, a wireless connection, an Internet connection, a POTS connection, any other suitable connection for conferencing, or combination thereof. The bridge 100 mixes the audio received from the various endpoints 50a-c for sending out as output for the conference. (Although three endpoints 50a-c are shown, any number can be part of the conference.)

In one example implementation, the bridge 100 can comprises software operating on one or more multipoint control units or servers, such as a RealPresence® Collaboration Server available from Polycom, Inc. (RealPresence is a registered trademark of Polycom, Inc.) Such a bridge 100 can operate a scalable video coding (SVC) environment in which the server functions as a media relay server. As such, the bridge 100 may not perform encoding and decoding or any transcoding between endpoints 50a-c and may instead determine in real-time which of the incoming layers to send to each endpoint 50a-c. However, other conferencing environments can be used, such as advanced video coding (AVC), and the bridge 100 can perform encoding, decoding, transcoding, and any other audio and video processing between endpoints 50a-c.

During operation, the system 10 selectively mixes audio from the endpoints 50a-c in the multi-way bridge call and produces an audio output that is encoded and sent back to the endpoints 50a-c from the bridge 100. A separate audio mix is created for each endpoint 50a-c because the transmitted audio from a given endpoint 50a-c is included in the mix.

During the conference, a participant at a given endpoint 50a-c may speak from time to time. All the while, the given endpoint 50a-c receives audio from its microphone 54, processes the audio, and sends the audio via the network connection to the bridge 100, which forwards the audio in a mix to the other endpoints 50a-c where far-end participants can hear the output audio. Likewise, a given endpoint 50a-c receives far-end audio from the bridge 100, processes (e.g., decodes) the far-end audio, and sends it to the loudspeaker 52 for the participant(s) to hear.

In addition to speech, some form of noise, such as typing sounds on a keyboard of a computer, rustling of paper, or the like, may be generated during the conference. If the noise is sent from where the noise originated to the various endpoints 50a-c, the participants may find the noise disruptive or distracting. Thus, it is desired in the mix of audio to hear all participants who talk, but to not hear extraneous interference like keyboard noises, paper rustling, etc. Therefore, the bridge 100 includes a speech selective mixer 105 to reduce the effects of noise. Further details of the bridge 100 and the mixer 105 are illustrated in FIGS. 2 and 3.

From time to time, two or more conferees may start to speak at or near the same time as one another, creating a speech collision. To handle these types of possible disruptions, the bridge 100 can include a collision handler 190 to handle collisions in the speech audio between endpoints 50a-c. Further details of the collision handler 190 are also discussed below.

B. Conference Bridge

Figure 2:
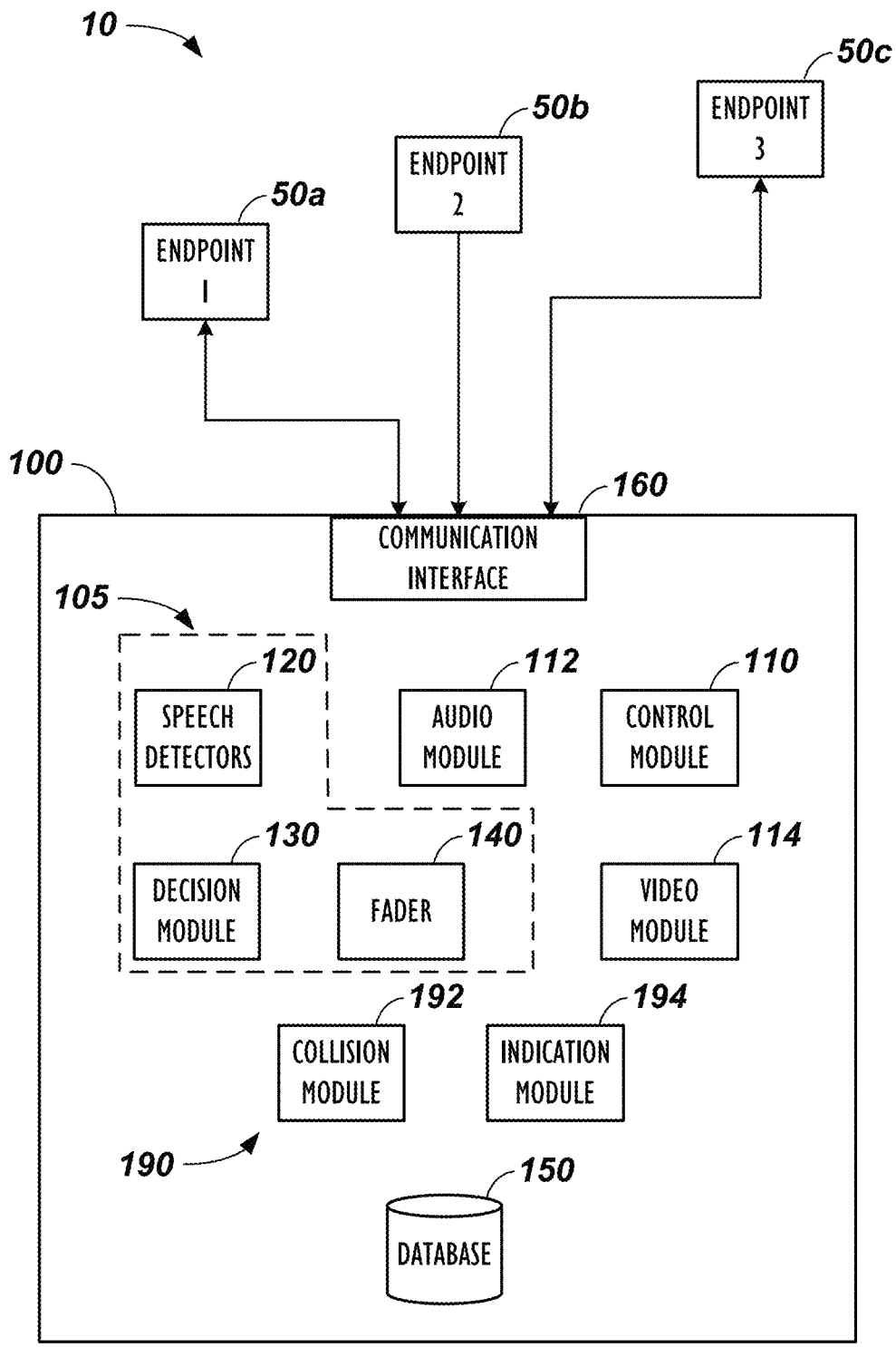
FIG. 2 illustrates details of a conference bridge of the disclosed conferencing system.
Figure 3:
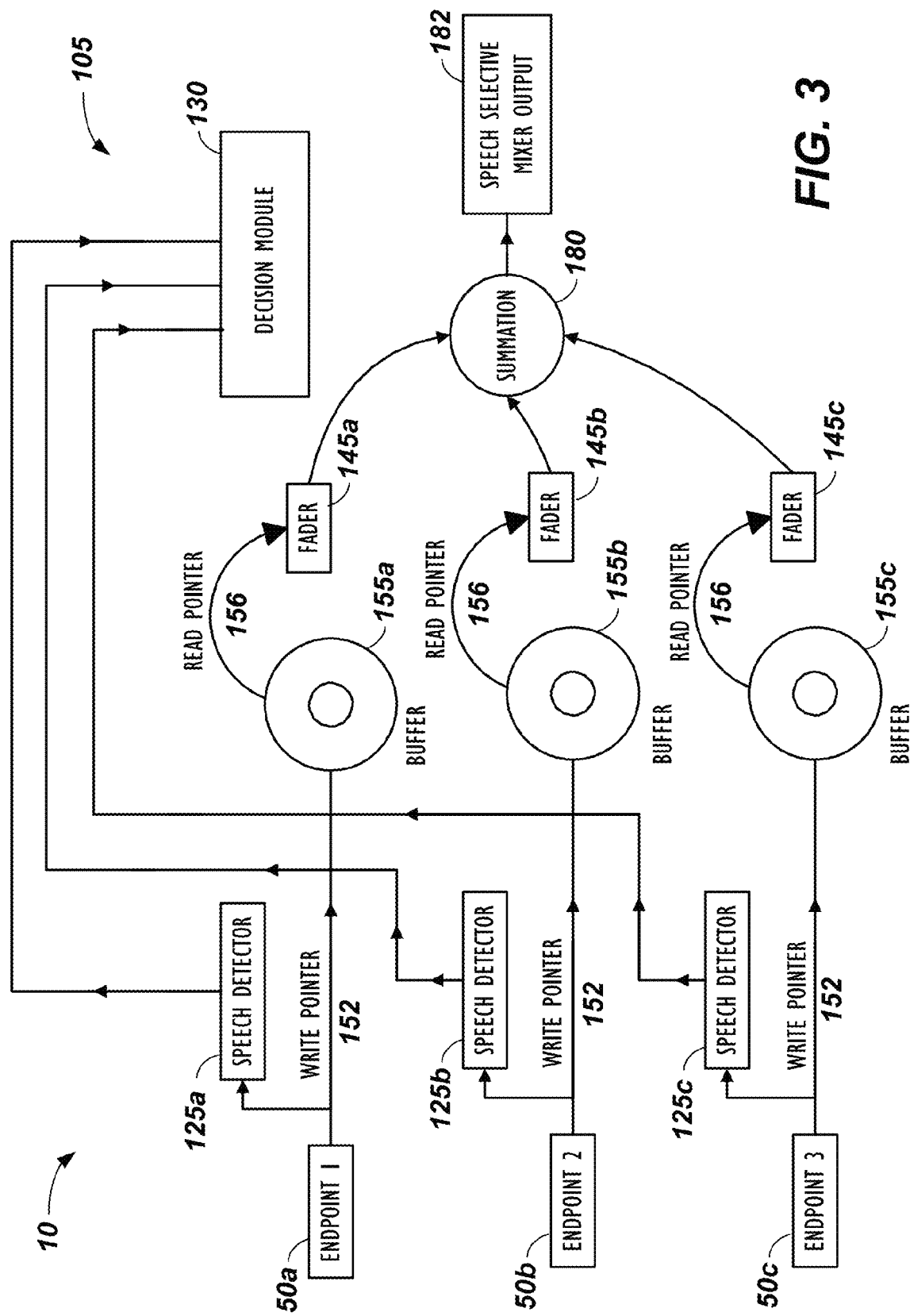
FIG. 3 illustrates operational features of the disclosed conferencing system.

As shown in FIG. 2, the bridge 100 includes a database 150 and various operational modules, including a control module 110, an audio module 112, a video module 114, a speech detector module 120, a decision module 130, a fader module 140, a network interface module 160, a collision module 192, and an indication module 194. The modules are used in conjunction with some conventional components of the bridge 100, and each of the modules can be implemented as software, hardware, or a combination thereof. A given implementation of the bridge 100 may or may not have all of these modules.

In general, the modules can be discrete components or can be integrated together. The modules can comprise one or more of a microcontroller, programmable Digital Signal Processor, Field Programmable Gate Array, or application-specific integrated circuit. The audio module 112 can include audio codecs, filter banks, and other common components. The video module 114 can include video codecs, compositing software, and the like. The network interface module 160 can use any conventional interfaces for teleconferencing and videoconferencing. Because details of the various modules are known in the art, they are not described in detail here.

As described in more detail below, the speech selective mixer 105 of the bridge 100 reduces the effects of noise. The mixer 105 at least includes features of the speech detector module 120, the decision module 130, and the fader module 140 and at least operates in conjunction with the control module 110 and the audio module 112. In general, the speech detector module 120 includes speech detectors to detect speech in the audio and to characterize the audio's energy from each of the endpoints 50a-c. The decision module 130 makes various decisions about how to control the gain of the endpoints' audio based on the speech detection and energy characterization. Finally, the fader module 140 controls the gain of the endpoints' audio being output and mixed by the mixer 105.

In addition to the speech selective mixer 105, the bridge 100 can include the collision handler 190 to handle potential speech collisions that may occur during the conference. As used herein, a speech collision refers to a situation where a conferee at one endpoint 50a-c starts to speak, speaks, interrupts, or talks concurrently with, at the same time, immediately after, over, etc. the speech of another conferee at another endpoint 50a-c.

As schematically shown in FIG. 2, the collision handler 190 of the bridge 100 at least includes a collision module 192 and an indication module 194 to detect and handle speech collisions during the conference. These operate in conjunction with the other modules, such as the control module 110, audio module 114, etc. Using these and other modules and techniques disclosed herein, the bridge 100 identifies the formation of a speech collision between endpoints 50a-c and responds by sending a speech-collision indication or alert to the relevant endpoints 50a-c (i.e., to the interrupting conferee and the other talker). In addition, the bridge 100 can further manage how to combine the audio signals (i.e., the one received from the interrupting conferee and the other received from the other talker) into the mix of conference audio. More information about the speech collision features of the bridge 100 are disclosed below in conjunction with FIGS. 6A-6B and 7.

C. Speech Selective Mixer

Operational features of the speech selective mixer 105 of the disclosed conferencing system 10 are illustrated in FIG. 3, which reproduces some of the previously discussed elements in conjunction with additional elements. Individual elements may be performed in any suitable combination of the endpoints 50a-c and/or bridge 100 depending on the conferencing environment. For example, the speech detectors 125a-c can be implemented at each of the endpoints 50a-c, can be implemented at the bridge 100, or can be implemented in a mixed manner at both. The buffers 155a-c, the faders 145a-c, logic of the decision module 130, and any of the other elements can be similarly implemented.

During operation, input audio from each endpoint 50a-c is processed by a speech detector 125a-c, which detects speech in the audio and characterizes the audio's energy level. Input audio from each of the endpoints 50a-c also passes to separate buffers 155a-c before being mixed and output.

Overall, the decision module 130 controls the mixing of the audio for output. To do this, the decision module 130 controls faders 145a-c for the audio of each endpoint 50a-c as that audio is being read from the buffers 155a-c and summed in summation circuitry 180 to produce speech selective mixer output 182.

D. Noise Reduction Processes

How the speech selective mixer 105 reduces the effects of noise will now be explained with further reference to noise reduction processes 200, 300, and 350 in FIGS. 4 and 5A-5B.

In general, the processes 200, 300, and 350 operate using software and hardware components of the bridge 100, the endpoints 50a-c, or a combination thereof. When speech is not detected but noise is present in the audio from a particular endpoint 50a-c, the processes 200, 300, and 350 reduce or mute the audio's gain that it is output for that particular endpoint 50a-c. In this way, when there is no speech in the audio, any irritating noises can be reduced or eliminated from the output audio being sent to the various endpoints 50a-c.

1. Talker Designation Process

Figure 4:
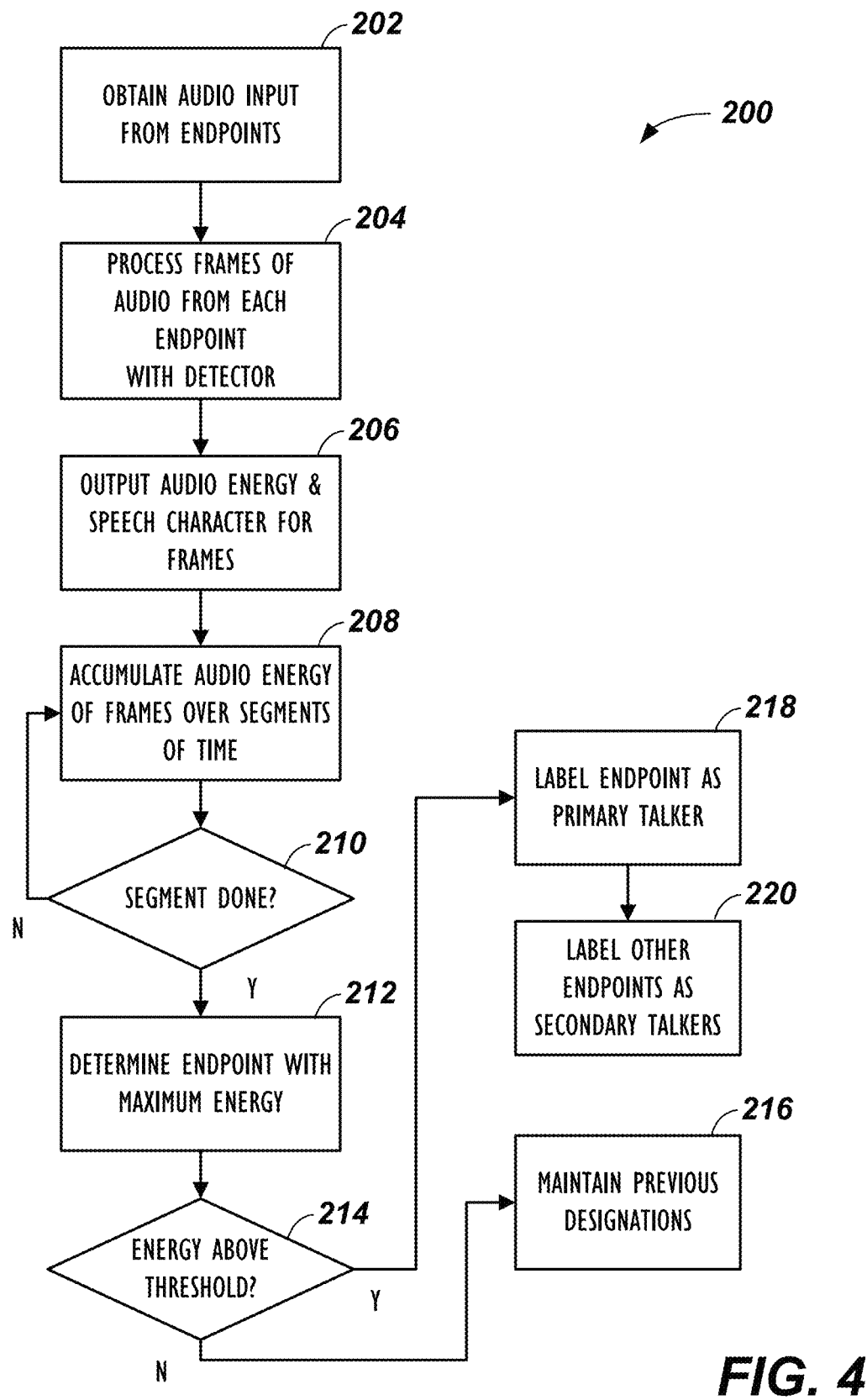
FIG. 4 illustrates a process for designating endpoints as a primary talker and as secondary talkers in the disclosed conferencing system.

Turning to FIG. 4, a process 200 is used for designating endpoints 50a-c as primary and secondary talkers in the disclosed conferencing system 100. For understanding, reference to FIG. 3 is made throughout the process 200.

As discussed below, the process 200 is described as being handled by the bridge 100, but other arrangements as disclosed herein can be used. Designating endpoints 50a-c as primary and secondary talkers helps with selecting how to process and mix the audio from the endpoints 50a-c for the conference. With that said, the system 10 can just as easily operate without designating the endpoints 50a-c and thereby treat the endpoints equally (namely as secondary endpoints).

The designation process 200 begins with the bridge 100 initially obtaining audio from the endpoints 50a-c (Block 202). This audio, which may or may not include speech and noise, is decoded. The bridge 100 then processes frames of the decoded audio from each endpoint 50a-c with its own speech detector 125a-c to detect speech and characterize the audio energies (Block 204). The frames can be 20-ms or other time interval.

For every frame, each detector 125a-c outputs the energy of the audio and additionally qualifies the audio as either being speech or non-speech for that frame (Block 206). The speech determination can be performed using a pitch detector based on techniques familiar to those skilled in the art of speech processing technology, although any other known speech detection technique can be used.

The energies and speech/non-speech determinations from all of the speech detectors 125a-c are fed to the decision module 130, which accumulates the total energy of speech determined for the frames from each of the endpoints 50a-c in consecutive segments of time (Block 208). The accumulated segments can have a length of 2 seconds. At the end of each segment (Yes—Decision 210), the decision module 130 finds the endpoint 50a-c with the maximum speech energy (Block 212).

If this energy is above a minimum threshold, the endpoint 50a-c with the maximum energy is labeled as a "Primary Talker" (Yes—Decision 214), and all other endpoints are labeled as "Secondary Talkers" (Block 220). Otherwise, the decision from the module 130 of the "Primary Talker" from the previously processed segment is maintained (Block 216).

The process 200 of designating the endpoints 50a-c as "Primary Talker" or "Secondary Talkers" continues throughout the conference. Additionally, the speech selective mixer 105 uses the designations throughout the conference to operate the faders 145a-c of the fader module 140 when mixing the audio. As shown previously with reference to FIG. 3, for example, the fader module 140 includes circular buffers 155a-c to which audio is written from the endpoints 50a-c with write pointers 152 and out of which audio is read using read pointers 156. The faders 145a-c operate gain levels on blocks of audio being read from the buffers 155a-c for mixing. These blocks can be about 20-ms blocks of audio. Control of the fader 145a-c and audio delay of the buffer 155a-c for an endpoint 50a-c is directed in part by the designation of the respective endpoint 50a-c as being primary or secondary.

2. Primary Talker Fader Operation

Figure 5A:
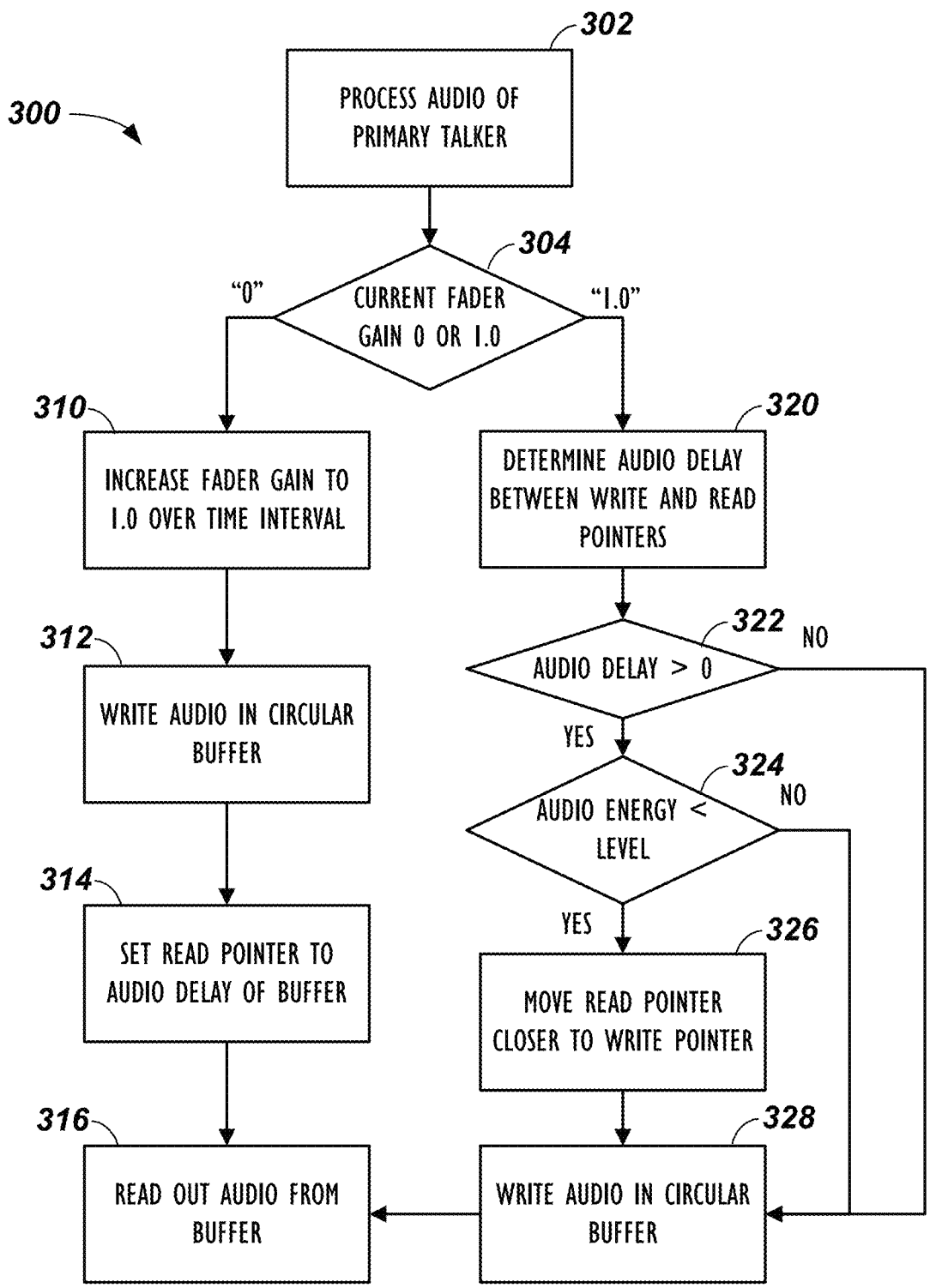
FIG. 5A illustrates a process for conducting a fader operation on a primary talker endpoint.

Turning to FIG. 5A, a fader operation 300 for a primary talker endpoint is shown. As discussed below, the fader operation 300 is described as being handled by the bridge 100, but other arrangements as disclosed herein can be used. In general, the fader operation 300 controls a gain of the fader 145a-c for the primary endpoint 50a-c in relation to a value of the audio delay for the buffer 155a-c of the primary endpoint 50a-c.

The fader operation 300 processes audio for the endpoint 50a-c, which has been designated the primary talker during the designation process 200 described previously (Block 302). The fader operation 300 is governed by the current gain setting of the fader 145a-c for the primary talker endpoint 50a-c (Decision 304). If the fader's gain is at or toward a minimum (e.g., zero), the fader's gain is increased toward a maximum (e.g., 1.0) over a time interval (Block 310). As will be appreciated, the fader's gain can have intermediate values during the continuous processing that are not discussed herein. Additionally, the fader's gain can be set or determined to be within some tolerance (e.g., 1, 5, 10%, etc.) of minimum and maximum levels during processing depending on the implementation.

To avoid clicks, the fader's gain is preferably increased gradually over an interval (e.g., 20-ms). All the while, the audio for the primary talker endpoint 50a-c is written to the associated circular buffer 155a-c, which can be a 120-ms circular buffer (Block 312). The read pointer 156 for this buffer 155a-c is preferably set to incur a comparable audio delay of the buffer (e.g., 120-ms) so as not to miss the beginnings of words by the primary talker at the endpoint 50a-c while the gain is increased over the time interval (Block 314). In the end, the audio is read out of the circular buffer 155a-c to be mixed in the speech selective mix output 182 by the summation circuitry 180 (Block 316).

If the fader's gain is already toward the maximum of 1.0 at Decision 304, however, the decision module 130 decreases the audio delay for the primary endpoint 50a-c toward a minimum value as long as the fader 145a-c for the primary endpoint 50a-c is toward this maximum gain and an energy level of the audio for the primary endpoint 50a-c is below a threshold. In particular, the decision module 130 determines the audio delay incurred by the current position of the read pointer 152 in the circular buffer 155a-c relative to the current position of the write pointer 156 (Block 193). The audio delay between the pointers 152 and 156 can be anywhere between a minimum (e.g., zero) and a maximum of the buffer (e.g., 120-ms). If the primary talker's endpoint 50a-c just had the gain for its fader 145a-c increased from zero to 1.0, then the audio delay would be greater than zero and would likely be at a maximum delay, for example.

In manipulating the audio delay for the buffers 155a-c, one decision is made based on the current audio delay (Decision 322), and another decision is made based on the audio energy level (Decision 324). If the audio delay is greater than zero (Yes—Decision 322) and if the audio energy is below a set level (Yes—Decision 324), then the read pointer 152 is moved closer (e.g., by 20-ms) to the write pointer 156 for the primary talker endpoint 50a-c (Block 326). As will be appreciated, the audio delay can have intermediate values during the continuous processing that are not discussed herein. Additionally, the audio delay can be set or determined to be within some tolerance (e.g., 1, 5, 10%, etc.) of minimum and maximum values during processing depending on the implementation The process 300 can then perform the steps of writing audio to the buffer 155a-c (Block 328) and reading out the audio from the buffer 155a-c to be mixed in the speech selective mix output 182 by the summation circuitry 180 (Block 316). As is understood, the process 300 then repeats during the conference as the system 10 handles frames of audio from the primary talker's endpoint 50a-c. Eventually through processing, the audio delay is guided toward zero between the pointers 152 and 156 to reduce lag in the primary talker's audio output.

To prevent unpleasant audio artifacts in Block 326, an overlap-add technique can be used to smooth over the discontinuity caused by the instantaneous shift of the read pointer 156. The goal is to gradually decrease the audio delay to zero with minimal artifacts by shifting the read pointer 156 only during low level portions of the audio (as determined in Decision 324). Thus, the shifting of the read pointer 156 is avoided when the primary talker's endpoint 50a-c has increased audio energy, because the shifting may be more noticeable and harder to smooth. Once the audio delay reaches zero (No—Decision 322) through processing, the primary talker's audio will be passed onto the mix without modification, thereby avoiding degradation of the primary talker's audio.

3. Secondary Talker Fader Operation

Figure 5B:
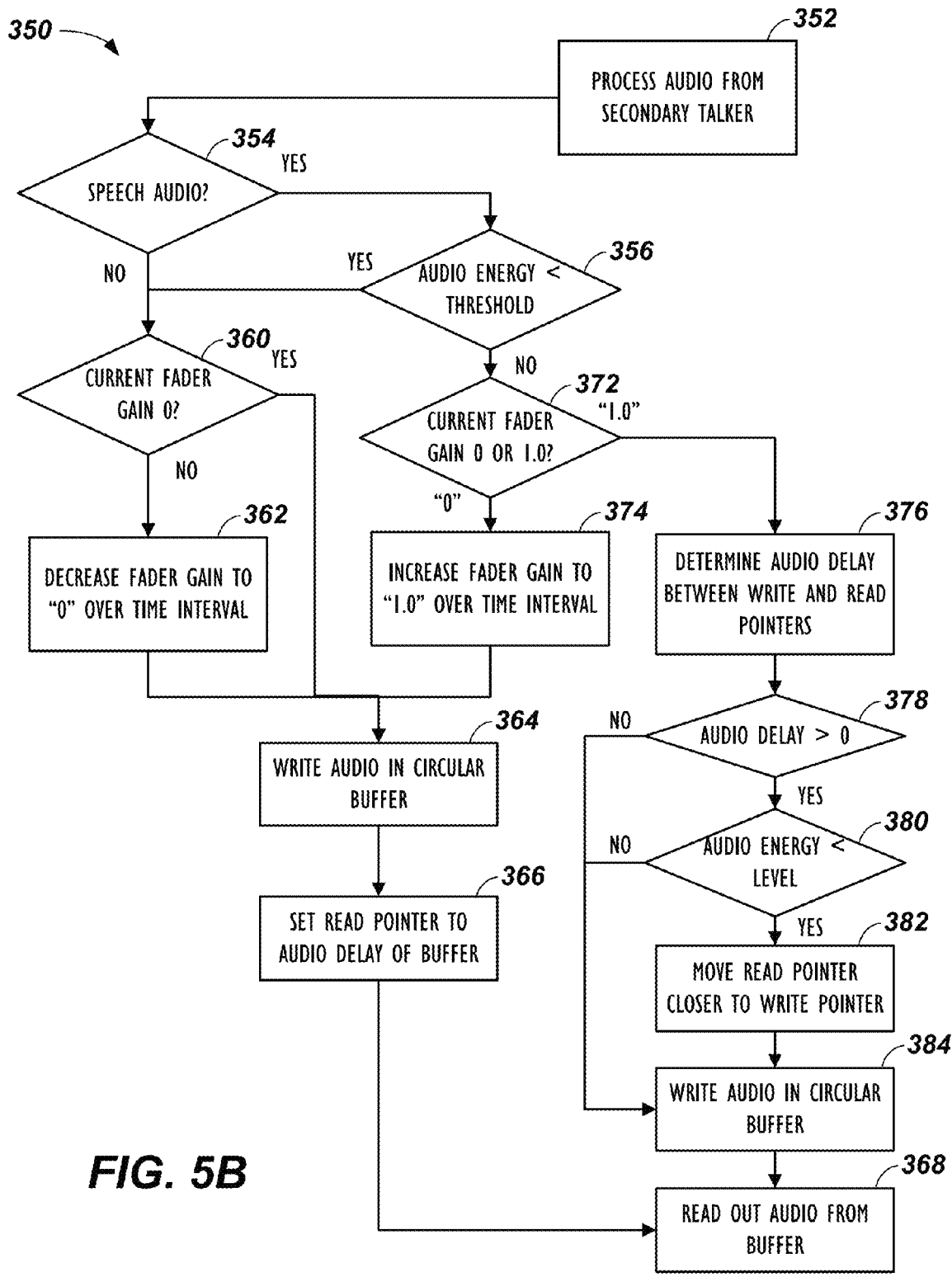
FIG. 5B illustrates a process for conducting a fader operation on a secondary talker endpoint.

Turning now to FIG. 5B, the fader operation 350 for the secondary talker endpoints is shown. As discussed below, the fader operation 350 is described as being handled by the bridge 100, but other arrangements as disclosed herein can be used. In general, the fader operation 350 controls a gain of the fader for the secondary endpoint 50a-c in relation to a value of the audio delay for the buffering of the secondary endpoint 50a-c.

The fader operation 350 processes audio for the endpoints 50a-c designated the secondary talkers during the designation process 200 described previously (Block 352). Looking at each of the designated secondary talker endpoints 50a-c, the fader operation 350 is governed by the current gain of the endpoint's fader 145a-c and the current speech level of the audio. In particular, the speech detector 125a-c for the endpoint 50a-c detects whether the audio is speech or not (Decision 354), and the audio energy level is compared to a threshold (Decision 356). Also, the current gain setting of the endpoint's fader 145a-c is determined (Decision 360). These decisions produce three possible scenarios for processing the gain of the fader 145a-c and the audio delay of the buffers 155a-c for the secondary talker endpoint 50a-c.

In a first scenario for the secondary talker endpoint 50a-c, the fader 145a-c of the secondary endpoint 50a-c is decreased toward a minimum gain as long as the audio of the secondary endpoint 50a-c is not detected speech. In particular, if the audio is not speech (No—Decision 354) or if the audio is speech (Yes—Decision 354) but with energy below a set minimum threshold (Yes—Decision 356), then the fader's gain is gradually reduced to zero over a time frame (e.g., 20 ms) (Block 362). The intention is to fade out the secondary talker's audio gradually when the audio is not speech or just speech below a threshold level. If the fader's gain is already zero (Yes—Decision 360), the fader's gain remains zero so that the secondary talker's audio is not output into the mix.

With the gain determined, processing the audio for this secondary talker endpoint 50a-c then continues as before by writing audio in the circular buffer 155a-c (Block 364), setting the read pointer 152 to the audio delay of the buffer 155a-c (Block 366), and reading out audio from the buffer 155a-c for the speech selective mix output 182 by the summation circuitry 180 (Block 368). As before, the read pointer 156 for the buffer 155a-c is set to incur a 120-ms audio delay so as not to miss the beginnings of words, should the fader's gain not be gradually set to zero yet over the time interval. Since the fader's gain for the non-speaking or low energy speaking endpoint is tended to zero, the audio from this endpoint will not be in the mix, thereby reducing the chances for noise.

In a second scenario, the fader 145a-c of the secondary endpoint 50a-c is increased toward a maximum gain as long as the audio of the secondary endpoint 50a-c is detected speech having an energy level above a threshold. In particular, if the audio is speech (Yes—Decision 354) for the secondary talker endpoint 50a-c with energy above a set minimum value (No—Decision 356) and if the fader's gain is zero ("0"—Decision 372), the fader's gain is gradually increased to 1.0 over intervals (e.g., 20-ms) to avoid clicks (Block 374). The audio is written to and read out of the 120-ms circular buffer 155a-c, and the read pointer 156 for this buffer 155a-c is set to incur a 120-ms audio delay in order not to miss the beginnings of words.

In a third scenario, the audio delay on the buffer 155a-c for the secondary endpoint 50a-c is decreased toward a minimum gain as long as the audio of the secondary endpoint 50a-c is detected speech having an energy level above a threshold. In particular, if the audio is speech (Yes—Decision 354) for the secondary talker endpoint 50a-c with energy above a set minimum value (No—Decision 356) and the fader gain is already 1.0 ("1"—Decision 372), a determination is made of the audio delay incurred by the position of the read pointer 152 in the circular buffer 155a-c relative to the position of the write pointer 156 (Block 376). As with the primary talker, one decision is made based on the current audio delay (Decision 378) for the secondary talker endpoint 50a-c, and another decision is made based on the audio energy level (Decision 380). If the audio delay is greater than zero (Yes—Decision 378) and if the audio energy is below a set level (Yes—Decision 378), then the read pointer 152 is moved 20-ms closer to the write pointer 156 (Block 382). Otherwise, the audio delay is not decreased, especially when the speech has an energy level above the threshold (Decision 380). In the end, the process 350 can then perform the steps of writing audio to the buffer 155a-c (Block 384) and reading out the audio from the buffer 155a-c (Block 368).

As is understood, the process 350 repeats during the conference as the system 10 handles frames of audio from the secondary talker's endpoint 50a-c. To prevent unpleasant audio artifacts, an overlap-add technique can be used to smooth over the discontinuity caused by the instantaneous shift of the read pointer 152 in Block 382. As with the primary talker, the goal here for the secondary talker is to gradually decrease the audio delay to zero with minimal artifacts by shifting the read pointer 152 only during low level portions of the speech audio as determined in Block 380.

In one benefit of the speech selective mixer 105 of the present disclosure, designation of the "Primary Talker" is expected to avoid audio degradations. On the other hand, the "Secondary Talkers" may have increased latency and may suffer occasional missed beginnings of words due to failures in speech discrimination. However, if an endpoint 50a-c designated as a "Secondary Talker" persists in capturing speech while other endpoints 50a-c remain quiet, eventually the "Secondary Talker" endpoint 50a-c will become the "Primary Talker" endpoint 50a-c by the designation process 200, thereby eliminating the degradations. In another benefit, those "Secondary Talker" endpoints 50a-c that do not have speech but just produce extraneous noises, like keyboard noises and paper rustling, will not be added into the audio mix.

In this way, if speech is not present in the audio of an endpoint 50*a-c*, then the speech selective mixer 105 is activated to either mute or reduce the gain of the audio for that endpoint 50*a-c* added to the mix. In this way, the speech selective mixer 105 acts to eliminate or reduce the amount of noise that will be present in the audio output to the endpoints 50*a-c*. As the conference progresses, the speech selective mixer 105 may mute or reduce audio for one or more of the inputs from time to time depending on whether speech is present in the audio. In this way, any noises that occur during the conference can be reduced or eliminated when the participant is not speaking. This is then intended to reduce the amount of disruptive noise sent to the endpoints 50*a-c* in the conference.

The teachings of the present disclosure, such as the processes 200, 300, and 350 of FIGS. 4 and 5A-5B, can be ultimately coded into a computer code and stored on a computer-readable media, such as a compact disk, a tape, stored in a volatile or non-volatile memory, etc. Accordingly, the teachings of the present disclosure can comprise instructions stored on a program storage device for causing a programmable control device to perform the process.

E. Speech Collision Handling

As noted above, the system 10 can handle speech collision during a conference as well. In general, the bridge 100, which is located in FIGS. 1-2 as an intermediate node between the endpoints 50*a-c*, can determine when two conferees at different endpoints 50*a-c* start speaking at substantially the same time leading to a possible speech collision. To deal with this, the bridge 100 can use the speech handler 190 to determine which audio from an endpoint 50*a-c* to use for the conference audio, which endpoint 50*a-c* need to be notified of the speech collision, and other decisions discussed below.

One of the endpoints 50*a-b* involved may be a primary endpoint already designated to have a primary talker, while the other of the endpoints 50*a-c* involved may be a secondary endpoint. Alternatively, the endpoints 50*a-c* involved may each be a secondary endpoint. Additionally, the speech for the endpoints 50*a-c* involved may be at various levels of gain and audio delay in a mixed output of the conference audio, as dictated by the mixer 105.

As defined previously, a speech collision can be defined as when endpoints 50*a-c* start speaking at substantially the same time. In general, the speech collision can form when one conferee at one endpoints 50*a-c* starts to speak, speaks, interrupts, or talks concurrently with, at the same time, immediately after, over, etc. the speech of another conferee at another endpoint 50*a-c*. A similar instance of a speech collision can occur when a first conferee at one endpoint 50*a-c*, who was recently designated as a primary talker, makes a short break in their speech (e.g., a few hundreds of milliseconds) and then starts talking again. Meanwhile, during that break, a second conferee at another endpoint 50*a-c* may start talking. In this instance, the first conferee can appear as the interrupting one. To handle this, the collision handler 190 can conclude that the first conferee was in a break in speech and can refer to the second conferee as the interrupting one.

Given that a speech collision has been determined, for example, the bridge 100 attempts to handle the collision by signaling to the interrupting conferee that he/she has initiated a speech collision. The signaling can be implemented by an alert message, such as but not limited to an icon, a text banner, or other visual indication that is presented in the video transmitted to the interrupting conferee's endpoint 50*a-c*. In parallel, another visual indication can be transmitted to the endpoint 50*a-c* of the other talker, indicating that a new conferee is trying to speak. In addition or as an alternative to the visual indication, an audio indication or alert can be sent to the interrupting conferee (and optionally the current talker). The audio indication or alert can be a beep, an interactive voice response (IVR), or the like.

In addition to informing one or both endpoints 50*a-c* of the speech collision, the bridge 100 can postpone adding the audio of the interrupting conferee into the audio mix for the conference at least for a short period. Such a delay enables the interrupting conferee to respond to the collision. Buffering may be used for the delay so that the beginning of the interrupting speech can still be retained if it is to be added to the mix of conference audio. Alternatively, blunt muting and unmuting can be used in the delay without regard to preserving the initial character of the interrupting speech.

Should the interrupting conferee continue speaking beyond the delay or some other time period or because the interrupting conferee has been signaled or allowed to speak, his/her audio can be added to the mix in a gradual way starting with a reduced gain of the audio and increasing the gain over time or in a certain slope until reaching a common volume. At this point of time, the collision indication can be removed, and both talkers can be mixed and heard as primary talkers by the other conferees.

Once both talkers are mixed as primary talkers, one of the talking conferees may stop talking for a certain period of time. The speech collision can be terminated at this point, and the remaining talker can continue as the only primary talker. The other endpoint 50*a-c* can be designated as secondary.

While both talkers are mixed as primary talkers, a third conferee may start speaking. In this instance, the collision module 190 can again initiate a collision indication into the video and/or audio of all the three conferees (i.e., the current two talkers and the new one). The bridge 100 may postpone adding the audio of the new talker to the audio mix for a short period, which can enable the new talker to respond to the collision indication. Should this new talker continue speaking, his/her audio can eventually be added to the mix in a gradual way starting with a reduced gain of the audio and increasing the gain over time or in a certain slope until a common volume is reached. At this point, the collision indication can be removed, and the audio of the three talkers can be mixed as primary talkers and heard by the other conferees.

As noted above with reference to FIGS. 1-2, for example, the conference bridge 100 can include the collision handler 190 having the collision module 192 and the indication module 194 to handle speech collisions during the conference. An example of these modules is schematically illustrated in the block diagram of the bridge 100 in FIG. 6A. Some of the previous modules of the bridge 100 are not shown here for simplicity, but may also be present.

As before, the bridge 100 may include the control module 110, the audio module 112, the video module 114, and the communication module 160. Alternative embodiments of the bridge 100 may have other components and/or may not include all of the components shown in FIG. 6A.

The communication module 160 receives communications from a plurality of endpoints (50*a-c*) via one or more networks and processes the communications according to one or more communication standards including H.120, H.321, H.323, H.324, SIP, etc. and one or more compression standards including H.261, H.263, H.264, G.711, G.722, MPEG, etc. The communication module 160 can receive and transmit control and data information to and from other bridges 100 and endpoints 50*a-c*. More information concerning the communication between endpoints 50*a-c* and the bridge 100 over networks and information describing signaling, control, compression, and setting a video call may be found in the International Telecommunication Union (ITU) standards H.120, H.321, H.323, H.261, H.263, H.264, G.711, G.722, G.729, and MPEG etc. or from the IETF Network Working Group website (information about SIP).

The communication module 160 may multiplex and de-multiplex the different signals, media, and/or "signaling and control" communicated between the endpoints 50a-c and the bridge 100. The compressed audio signal may be transferred to and from the audio module 112, and the compressed video signal may be transferred to and from the video module 114. The "control and signaling" signals may be transferred to and from the control module 110.

In addition to these common operations, the bridge 100 is configured to detect the formation of a speech collision and manage the speech collision in a way that reduces the interference to the flow of the conference. The technique can alert the two relevant conferees at the endpoints (i.e., the interrupting one and the other talker) and can manage how to combine the audio of the interrupting conferee to the mix of audio for the conference.

In particular, the audio module 112 receives compressed audio streams from the endpoints 50a-c. The audio module 112 decodes the compressed audio streams, analyzes the decoded streams for speech and energy levels, selects certain streams, and mixes the selected streams based on the mixer 105 discussed above. The mixed stream can be compressed, and the compressed audio stream can be sent to the communication module 160, which sends the compressed audio streams to the different endpoints 50a-c. In alternative configurations as disclosed herein, the bridge 100 and the audio module 112 may not be responsible for any encoding, decoding, and transcoding of audio and may only be involved in relay of audio.

Audio streams that are sent to different endpoints 50a-c may be different. For example, the audio stream may be formatted according to a different communication standard and according to the needs of the individual endpoint 50a-c. The audio stream may not include the voice of the conferee associated with the endpoint 50a-c to which the audio stream is sent. However, the voice of this conferee may be included in all other audio streams.

The audio module 112 is further adapted to analyze the received audio signals from the endpoints 50a-c and determine the energy of each audio signal. Information of the signal energy is transferred to the control module 110 via the control line 106.

As shown, the features of the speech-collision module 190 can include a speech-collision detector 192A and a speech-collision controller 192B. As expected, the audio module 112 can include the detector 192A, and the control module 110 can include the controller 192B.

The speech-collision detector 192A is configured to determine the formation of a speech collision in a conference by analyzing the audio energy received from each endpoint 50a-c. The energy level is used as a selection parameter for selecting appropriate one or more endpoints 50a-c as an audio source to be mixed in the conference audio.

Further, the detector 192A can be configured to identifying the timing in which two conferees at endpoints 50a-c start talking concurrently, at the same time, over one another, etc., leading to a speech collision. Then, the detector 192A can manage the speech collision without significantly interrupting the flow of the conference. More information about the operation of speech-collision detector 192A and controller 192B is disclosed below in conjunction with FIGS. 6B and 7.

In addition to its common operations, the bridge 100 is capable of additional functionality as result of having the control module 110. The control module 110 may control the operation of the bridge 100 and the operation of its internal modules, such as the audio module 112, the video module 114, etc. The control module 110 may include logic modules that may process instructions received from the different internal modules of the bridge 100. The control signals may be sent and received via control lines: 106A, 106B, and/or 108. Control signals may also include, but are not limited to, commands received from a participant via a click and view function; detected status information from the video module 114; receive indication about a speech-collision from the detector 192A via communication link 106A, etc.

As noted above, the control module 110 includes the speech-collision controller 192B that together with the detector 192A handles a speech collision. The controller 192B receives from the detector's indication of a formation of a speech collision as well as an indication of the two or more endpoints 50a-c that have colliding speech. In turn, the controller 192B instructs the indication module's editor module 194E of the video module 114 to present an appropriate text message, icon, or other visual indication on the video image that is transferred to the endpoint 50a-c of the interrupting conferee. A visual indication can also be sent to the other endpoint 50a-c.

In some examples, the visual indication may include a menu asking the interrupting conferee how to proceed (e.g., to disregard the collision warning and force the conferee's audio or to concede to the other conferee, adapt the collision mechanism to a noisy site, etc.). In alternative examples, an audio indication can be used with or without the visual indication. The audio indication can be a beep, an interactive voice response (IVR), or other audible alert, for example. To produce such an audio indication, the editor module 194E would be present in the audio module 112.

Dealing here with the visual indication, the video module 114 receives compressed video streams from the endpoints 50a-c, which are sent toward the bridge 100 via the network and are processed by the communication module 160. In turn, the video module 114 creates one or more compressed video images according to one or more layouts that are associated with one or more conferences currently being conducted by the bridge 100. In addition, using the editor module 194E, the video module 114 can add the visual indication of a speech collision to the video image that is transferred to the endpoint 50a-c of the interrupting conferee as well as the conferee that just started talking a short period before the interrupting conferee. The short period can be in the range of few hundreds of milliseconds to few seconds, for example.

As shown, the video module 114 can include one or more input modules IM, one or more output modules OM, and a video common interface VCI. The input modules IM handle compressed input video streams from one or more participating endpoints 50a-c, and each input module IM has a decoder 115D for decoding the compressed input video streams. The decoded video stream can be transferred via the common interface VCI to one or more video output modules OM. These output modules OM generate composed, compressed output of video streams of the video images for sending to an endpoint 50a-c. The output modules OM can use the editor modules 194E to add an appropriate visual indication of a speech collision to the video image to be sent to the endpoint 50a-c of the interrupting conferee (and optionally the endpoint 50a-c of the other talker conferee).

The compressed output video streams may be composed from several input streams to form a video stream representing the conference for designated endpoints. Uncompressed video data may be transferred from the input modules IM to the output modules OM via the common interface VCI, which may comprise any suitable type of interface, including a Time Division Multiplexing (TDM) interface, an Asynchronous Transfer Mode (ATM) interface, a packet based interface, and/or shared memory. The data on the common interface VCI may be fully uncompressed or partially uncompressed. The operation of an example video module 114 is described in U.S. Pat. No. 6,100,973.

Figure 6A:
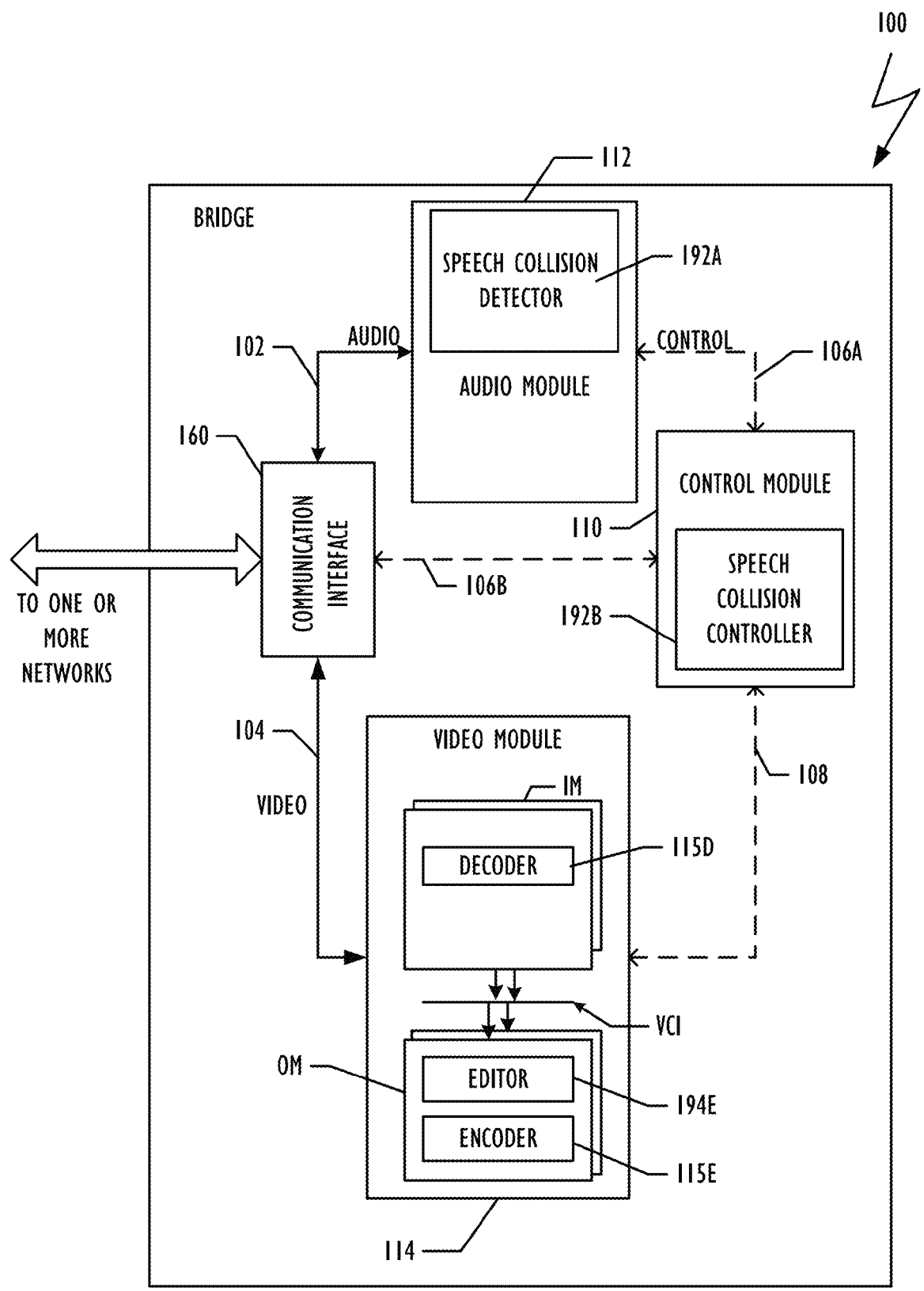
FIG. 6A schematically illustrates a simplified block diagram with relevant elements of a conference bridge capable of handling speech collision according to the present disclosure.

As specifically shown in FIG. 6A, the output module OM can have the editor module 194E and an encoder 115E. The editor module 194E can modify, scale, crop, and place video data of each selected conferee into an editor frame memory, according to the location and the size of the image in the layout associated with the composed video of the image. The modification may be done according to instructions received from speech-collision controller 192B. Each rectangle (segment, window) on the screen layout may contain a modified image from a different endpoint 50a-c.

In addition to common instruction for building a video image, the speech-collision controller 192B instructs the editor module 194E, which is associated with an interrupting endpoint 50a-c, to add the visual indication (e.g., a text message or an icon) over the video image that is currently ready in an image frame memory. The visual indication can then inform the interrupting conferee at the associated endpoint 50a-c that he/she has started a speech collision.

In parallel, the controller 192B can instruct the editor module 194E associated with the endpoint 50a-c of the other talker conferee, who just started talking a short period earlier, that the interrupting conferee is willing to talk too. The ready frame memory having a ready video image with or without the visual indication can be fetched by the encoder 115E that encodes (compresses) the fetched video image, and the compressed video image can be transferred to the relevant endpoint 50a-c via communication module 160 and network.

Common functionality of various elements of the video module 114 is known in the art and is not described in detail herein. Different video modules are described in U.S. patent application Ser. Nos. 10/144,561; 11/751,558; and Ser. No. 12/683,806; U.S. Pat. No. 6,100,973; U.S. Pat. No. 8,144,186 and International Patent Application Serial No. PCT/IL01/00757, the contents of which are incorporated herein by reference in their entirety for all purposes. The control buses 106A, 108, 106B, the compressed video bus 104, and the compressed audio bus 102 may be any desired type of interface including a Time Division Multiplexing (TDM) interface, an Asynchronous Transfer Mode (ATM) interface, a packet based interface, and/or shared memory.

Figure 6B:
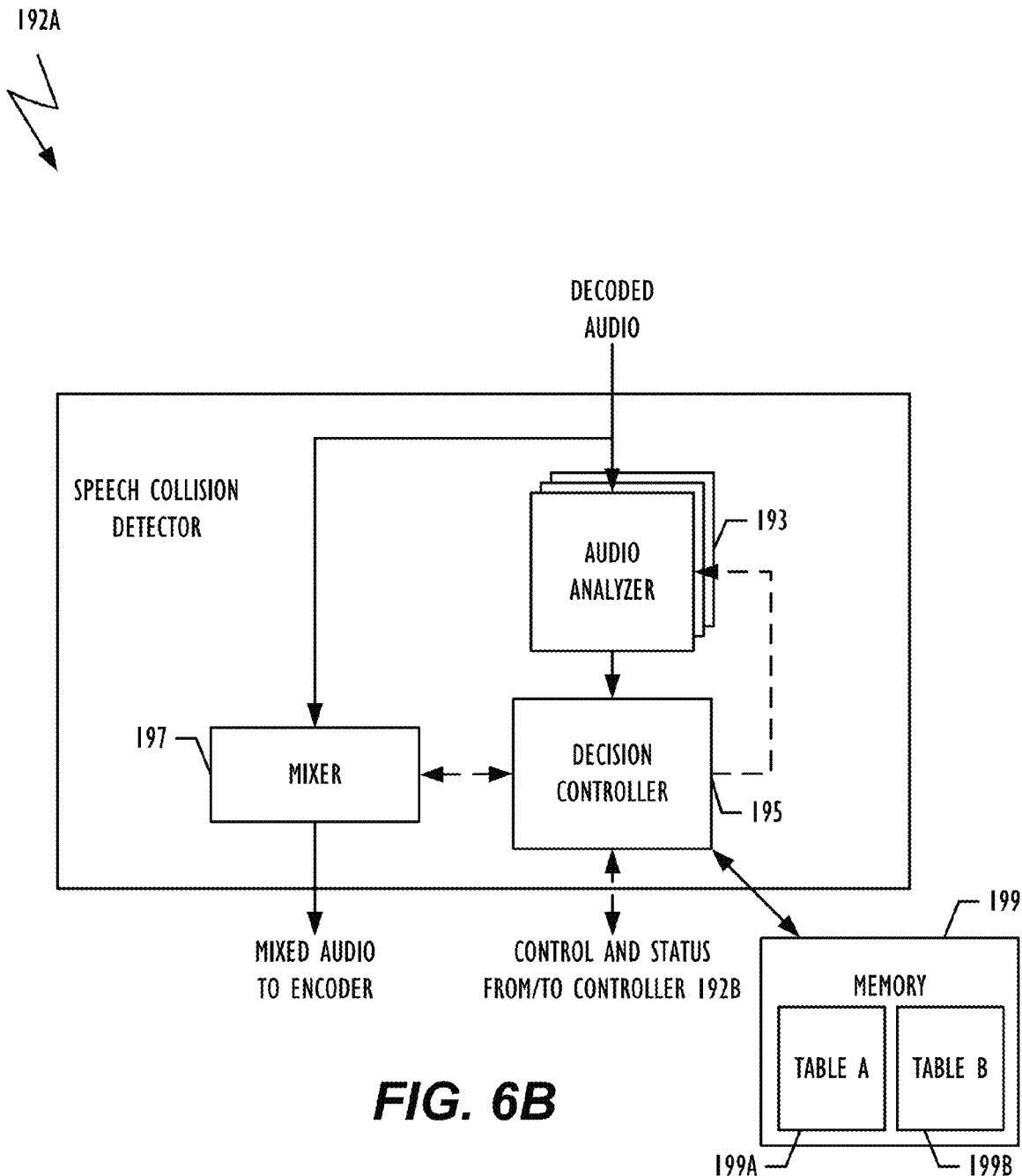
FIG. 6B schematically illustrates a simplified block diagram of a speech-collision detector according to the present disclosure.

Referring now to FIG. 6B, a block diagram illustrates some elements of a speech-collision detector 192A according to the present disclosure. As noted previously, the speech-collision detector 192A may be used to detect formation of a speech collision between an interrupting conferee at one endpoint 50a-c that starts talking almost simultaneously with another conferee at another endpoint 50a-c. Almost simultaneously as used here can refer to a short period of a few hundreds of milliseconds from the moment that the other talker starts talking, for example. The period of time can be configurable and may depend on whether the endpoints 50a-c involved are secondary or primary and which of these is interrupting the other.

In some instances, a first conferee who has been talking for an extended period (e.g., longer than tens of seconds) may make a short break in speaking. During the break, however, a second conferee may start talking at another endpoint 50a-c, whereafter the first conferee may renew his/her talking. The short break can be in the range of a few milliseconds. In such a case, the second conferee can be designated as an interrupting conferee. In other words, the endpoint 50a-c of the second conferee can be designated as an interrupting endpoint 50a-c in relation to the primary endpoint 50a-c of the first conferee, which had been talking and has merely broke speech momentarily.

The decision of the speech-collision detector 192A is based on the audio obtained from the different endpoints 50a-c. To do this, the speech-collision detector 192A includes one or more audio analyzers 193, a decision controller 195, and a mixer module 197. Each of the audio analyzers 193 can be associated with a decoded audio stream received from a certain transmitting endpoint 50a-c.

The speech-collision detector 192A can be a part of the audio module 112, as described above, and may obtain the decoded audio data from the relevant audio decoders (not shown in the drawings). In fact, the audio analyzers 193 may include or rely on the speech detection and energy level determination of the speech detectors (125: FIG. 3) described previously. Similarly, the decision controller 195 can be part of the control module (110: FIG. 3) or the like, and the mixer 197 can use features of the faders (145), buffers (155), and summing circuitry (180) already discussed.

From time to time, each of the audio analyzers 193 determines the audio energy related to its associated audio stream for a certain sampling period. The sampling period can be in the range of a few tens of milliseconds, such as 10 to 60-ms, for example. In some embodiments, the sampling period can be similar to the time period covered by an audio frame (e.g., 10 or 20-ms). The indication about the audio energy for that sampling period is then transferred toward the decision controller 195.

Some embodiments of the audio analyzers 193 can utilize a Voice Activity Detection (VAD) algorithm for determining that human speech is detected in the audio stream. The VAD algorithm can be used as a criterion for using or not using the value of the calculated audio energy. The VAD algorithm and audio analyzing techniques are known to a person having ordinary skill in the art of video or audio conferencing. A possible embodiment of the decision controller 195 may obtain from each audio analyzer 193 periodic indications of the audio energy with or without VAD indication.

The decision controller 195 compares between the audio energy of the different streams and can select a set of two or more streams (two or more transmitting endpoints 50a-c) to be mixed during the next period. The number of selected streams depends on the capability of the mixer 197, or on a parameter that was predefined by a user or a conferee, etc. The selected criteria can include a certain number of streams that have the highest audio energy during the last period, another criterion can be a manual selection, etc. This selection is not strictly necessary because the selective mixing features may handle this.

In addition, the decision controller 195 detects a formation of a speech collision and transfers an indication of the speech collision and the relevant conferees' endpoints 50a-c toward the controller (192B: FIG. 6A). In turn, the controller (192B) instructs the relevant editor (194E: FIG. 6A) to add a visual indication or alert over a created video image transmitted toward the relevant conferees' endpoints 50a-c. The visual indication can inform a conferee that he/she is an interrupting conferee, and the visual indication targeted to the other talker can point out the interrupting conferee. As already noted, audio indications or alerts can be sent instead of the visual indication or in combination with the visual indication.

In some embodiments, the detector 192A can detect formation of the speech collision by looking for a significant change in the audio energy received from the interrupting conferee. The change can occur in a particular time interval (e.g., adjacent, immediately after, etc.) to a significant change in the audio energy received from the primary conferee (i.e., the primary endpoint). The time interval can be in the range of zero to few hundred of milliseconds, for example. A significant change can be defined in a number of ways and in general would be an increase in audio energy that could be heard by the other conferees if added to the mix. For example, an increase of about 10%, 20%, 30% etc. above current levels, depending on the circumstances.

To detect the formation of the speech collision, the decision controller 195 can mange an audio energy table 199A stored in memory 199. As an example, the table 199A can be stored in a cyclic memory 199 configured to store information for a few seconds (e.g., 1 to 10-s). Each row in the table 199A can be associated with a sampling period, and each column in the table 199A can be associated with an endpoint 50a-c participating in the conference. At the end of each sampling period, the decision controller 195 may obtain from each audio analyzer 193 an indication of the audio energy received from the endpoint 50a-c associated with that audio analyzer 193 to be written (stored) in the appropriate cell of the audio energy table 199.

At the end of each sampling period, the decision controller 195 scans the audio energy table 199A, looking for significant increases in the audio energy received from an interrupting endpoint 50a-c immediately after a significant increase in the audio energy received from the primary endpoint 50a-c. To improve the accuracy of its decision and eliminate cases in which the jump in the audio energy is due to random noise, such as a cough, the decision controller 195 can use a low-pass filter, for example, or may relay more on the speech detection.

Other than an audio energy table 199A as discussed above, the decision controller 195 may use a table 199B based on a sliding average of the audio energies. Each row in this table 199B can be associated with an average value of the audio energy of the last few sampling periods including the one that was just terminated. Each column in this table 199B can be associated with an endpoint 50a-c participating in the conference.

At the end of each sampling period, the decision controller 195 can scan the table 199B column by column looking for an endpoint 50a-c having a significant change in the sliding-average audio energy that occurs immediately after (i.e., within a time interval) a similar change in the sliding-average audio energy of another endpoint 50a-c. A significant change can be defined in a number of ways, and the time interval for being immediately after can be two to eight sampling periods, for example. Such consecutive changes can point to a formation of a speech collision.

After detecting the formation of the speech collision, the decision controller 195 informs the controller (192B: FIG. 6A) about the speech collision and the relevant two endpoints 50a-c (i.e., the interrupting endpoint and the primary endpoint). In addition, the decision controller 195 can instruct the mixer 197 to add the decoded audio stream received from the interrupting endpoint 50a-c to the mixed audio. This may involve increasing the gain of the fader 145 for the interrupting endpoint 50a-c. At this point of time, the collision alert can be removed, and both talkers can be mixed and heard by the other conferees.

In some embodiments, the instruction to add the decoded audio can be postponed for a few sampling periods (e.g., two to four sampling periods). Postponing mixing the interrupting endpoint's audio can allow the conferee at the interrupting endpoint 50a-c to reconsider his/her willingness to talk and to perhaps avoid the inconvenience of the speech collision.

In other embodiments, the decision controller 195 instructs the mixer 197 to start mixing the decoded audio stream of the interrupting conferee in a gradual way starting with a reduced volume of the audio and increasing the volume in a certain slope until reaching a common volume for that session. Again, this may involve increasing the gain of the fader 145 for the interrupting endpoint 50a-c. At this point of time, the collision alert can be removed, and both talkers can be mixed and heard by the other conferees. In other words, the mixed audio at the output of the mixer 197 can be transferred toward one or more conferees via an audio encoder (not shown in the drawings), communication module (160: FIG. 6A) and the network.

In some embodiments, the audio analyzers 193 and the decision controller 195 can be part of the speech-collision controller 192B (FIG. 6A). In such embodiments for every sampling period, the audio analyzers 193 may just obtain an indication of the audio energy associated with each endpoint 50a-c. An embodiment of the decision controller 195 can send instructions toward a mixer module at the audio module (112: FIG. 3). Such an embodiment can be implemented by an media relay bridge in media relay conferencing of compressed audio packets. The audio analyzers 193 can be configured to retrieve the audio energy indication that can be associated with the compressed audio packet. The audio module 112 and the mixer 197 in such an embodiment can be located at a receiving endpoint 50a-c.

Figure 7:
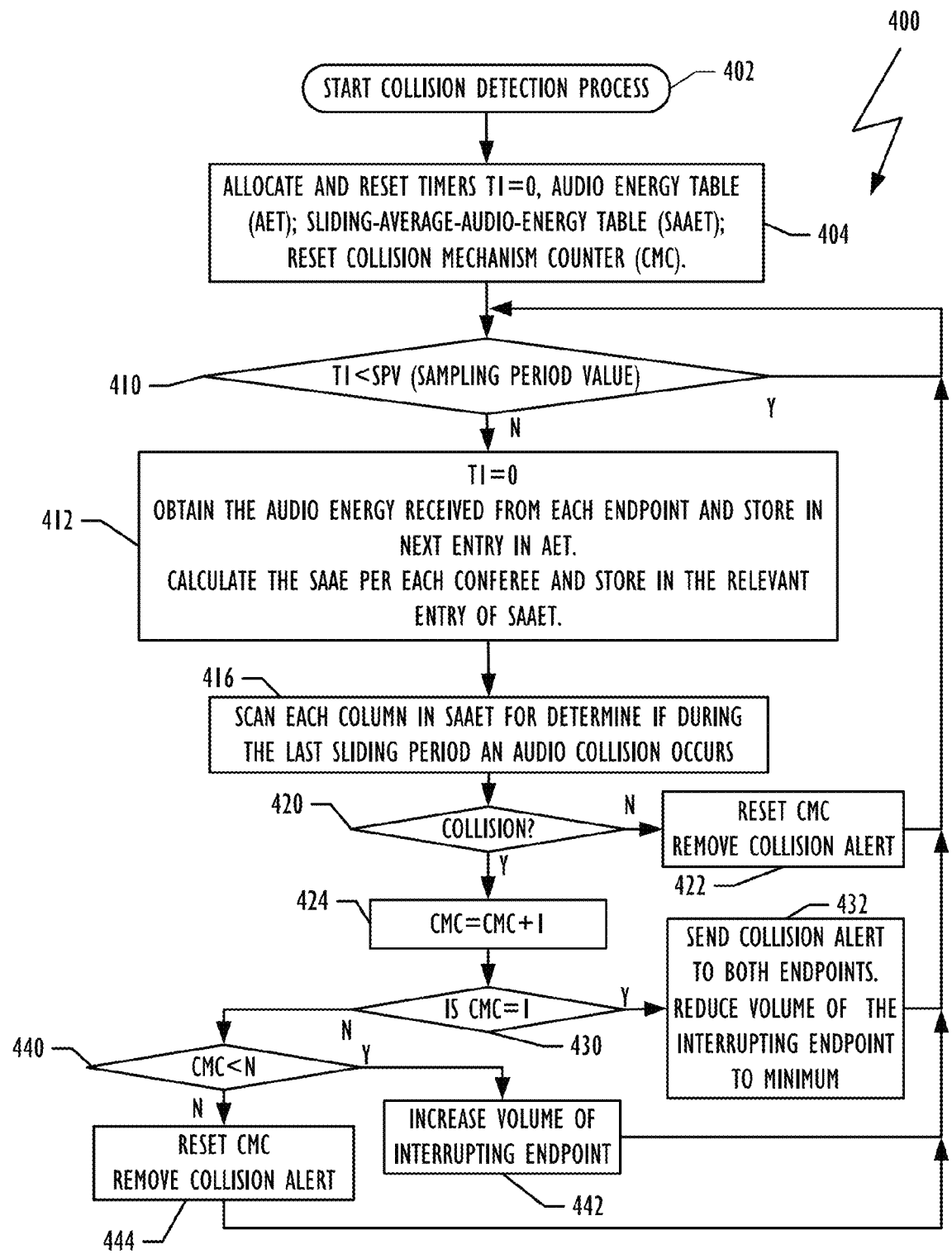
FIG. 7 illustrates a flowchart for a process of detecting and handling a speech collision according to the present disclosure.

FIG. 7 illustrates a flowchart of a process 400 according to one embodiment that may be executed by the decision controller 195 (FIG. 6B). The process 400 may be used for detecting a formation of speech collision. In one example of the process 400, a sliding average of the audio energy can be used as a low pass filter for reducing jumping into a speech collision when there is only a temporary change in the audio energy.

The process 400 may be initiated upon establishing of a conference (Block 402). After initiation, a timer T1, an audio energy table 199A, a sliding-average audio energy table 199B, and a collision-mechanism counter are allocated and reset (Block 404). The timer T1 can be used for defining the sampling period of the audio energy, which can be in the range of a few milliseconds to a few tens of milliseconds. Values of the sampling period can be a configurable number in the range between 10 to 60-ms. In some embodiments, the sampling period can be proportional to the audio frame rate.

The value of sampling period can be defined when establishing the conference. The timer T1 can have a clock value of a few KHz (e.g., 1-5 KHz). The allocated tables 199A-B can have a plurality of rows and columns. Each row can be associated with a sampling period, and each column can be associated with an endpoint. The content of the tables 199A-B can be over written in a cyclic mode. The cycle of each table can be few tens of the sampling period (e.g., 10 to 200 sampling periods). Examples of counter mechanisms can count a few sampling periods (e.g., 10 to 200).

After allocating and setting the relevant resources (Block 404), the value of the timer T1 is compared to the value of the sampling period (Block 410). If the timer T1 is smaller than the sampling period value, then the process 400 may wait until the timer T1 is not smaller than the value. When this occurs, then the timer T1 is reset, and the audio energy from each endpoint 50a-c is sampled and calculated (Block 412). The value of the audio energy of each endpoint 50a-c is written in the audio energy table 199A in an appropriate cell.

Then, the sliding-average of the audio energy can be calculated 412, for each endpoint 50a-c, by calculating the average audio energy of that endpoint 50a-c during the last two or more sampling periods including the current one. The number of sampling periods that can be used in a sliding window, which can be a configurable number in the range of a few sampling periods (e.g., 3 to 10 sampling periods). In one embodiment, a first value can be defined when the conference is established, and the number of sampling periods in the sliding window can be adapted during the session according to the type of the session. The value of the sliding-average audio energy can be written in the sliding-average table 199B in the cell assigned to the current sampling period and the relevant endpoint 50a-c.

After calculating the sliding-average audio energy of all the endpoints 50a-c for the current sampling period, the process 400 can scan the table 199B column by column looking for a significant increase or jump in the sliding-average audio energy of each endpoint 50a-c (Block 416) to determine if a jump in one endpoint 50a-c occurs immediately after a similar change in another endpoint 50a-c. Such adjacent changes can point to a formation of a speech collision. A significant change can be defined as the change in the audio energy that could be heard by the other endpoints, for example. Yet in some embodiments, a significant change can be a change of more than a few tens of percentage of the total scale of the audio energy. It can be 20, 30 or 40 percent of the total scale, for example. The time period following immediately after can be in the range of two to ten sampling periods, for example.

At the end of the scanning, a decision can be made whether a formation of a speech collision was detected (Decision 420). If not, then the counter and the alert can be reset (Block 422), and the process 400 can return to block 410 to look for the value of the timer T1. If a collision was detected at decision 420, then the counter can be incremented by one increment (Block 424), and a decision can be made whether the counter is equal to one (Decision 430). If yes, then the indication of a formation of a speech collision and the relevant endpoints 50a-c (the interrupting talker and the other talker) is transferred to the speech-collision controller (192B: FIG. 6A) (Block 432). In addition, the mixer (197: FIG. 6B) is instructed to add the audio stream of the interrupting endpoint 50a-c to the mixer 197 with a minimum volume. Finally, the process 400 can return to block 410.

If the counter is not equal to one (Decision 430), the mixer 197 (FIG. 6B) can be instructed to increase the volume of the audio that was received from the interrupting endpoint 50a-c (Block 442). Increasing the volume can be done in a few steps up to a common volume. The increasing portion of the audio for each step can be defined as a function of the value of N and the number of steps used until reaching the common volume. As noted, increasing the volume can involve increasing the gain of an appropriate fader 145.

Then, the process 400 can return to Block 410 for checking the value of the timer T1. If the value of the counter is not smaller than N (Block 440), then the counter can be reset (Block 444), and the collision alert can be removed. The process 400 can return to block 410.

In some embodiments of process 400, the actions that are related to Blocks 424 to 444 can have one or more instance, and each instance can handle different speech collision. Yet other embodiment, the process 400 can be adapted to identify a situation in which a conferee that was talking for a period, makes a short break and returns to talk. In this case, the process 400 can be configured to consider this endpoint as not interrupting, especially when this endpoint renews its talking and create a potential speech collision event. Accordingly, the process 400 may rely more heavily on the talker designation of primary or secondary when comparing audio energy levels.

Last but not the least, some embodiments of the decision controller 195 (FIG. 6B) can be configured to deliver reports at the end of a conference session. The reports can include information about the speech collision events that occur in the session, number of events, the interrupting conferees, etc. Those reports can be used later on for preparing a user guide for participating in conference sessions.

F. Conferencing Environments

As noted above, the conferencing system 10 of the present disclosure can be implemented in several types of conferencing environments. For example, in one implementation, the bridge 100 can operate an advanced video coding (AVC) conferencing environment, and the bridge 100 can perform encoding, decoding, transcoding, and any other audio and video processing between endpoints 50a-c. This AVC mode requires more functioning to be performed by the bridge 100, but can simplify the processing and communication at and between the endpoints 50a-c. (The details related to this mode of operation have been primarily disclosed above with particular reference to the features of the speech selective mixer 105 and the collision handler 190 at the bridge 100.)

In another implementation, the bridge 100 can operate a scalable video coding (SVC) environment in which the bridge 100 functions as a media relay server. As such, the bridge 100 may not perform encoding and decoding or any transcoding between endpoints 50a-c and may instead determine in real-time which of the incoming layers to send to each endpoint 50a-c. In yet additional implementations, the bridge 100 can operate in a mixed mode of both SVC and AVC environments, or the conferencing system 10 can operate in a bridgeless mode without a bridge 100.

Operating in these various modes requires processing to be performed at different devices and locations in the conferencing system 10. Additionally, information must be communicated between various devices of the system 10 as needed to implement the purposes of the present disclosure. Details related to the processing and communication involved in these various modes is briefly discussed below.

Figure 8A:
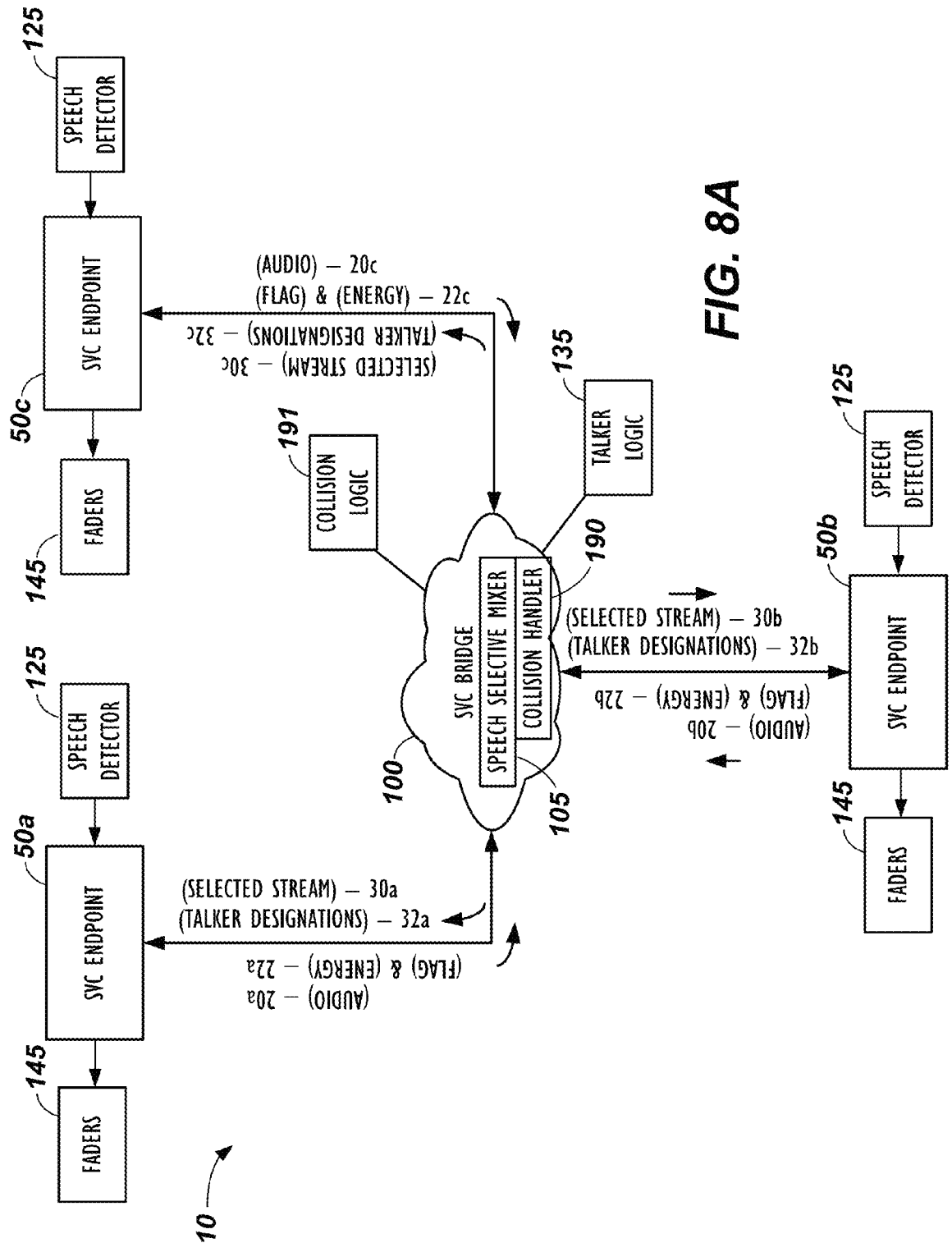
FIGS. 8A-8C illustrate the conferencing system in different conferencing environments.

Details related to the conferencing system 10 in the SVC mode are schematically shown in FIG. 8A. In the SVC mode, the SVC bridge 100 performs packet switching only and does not perform transcoding. The endpoints (e.g., 50a-c) operate as SVC endpoints and perform speech/energy detection, fader controls, and speech collision handling, instead of these functions being performed by the bridge 100. Thus, the functionality of the speech selective mixer 105 and collision handler 190 are really handled by the SVC endpoints 50a-c and are only schematically shown in FIG. 6A.

In the SVC endpoints 50a-c, the transmitting endpoint's speech detector 125 detects speech/non-speech frames and energy in a manner similar to that discussed above. The transmitting SVC endpoint 50a-c sends its audio 20a-c and a speech/non-speech flag and energy level information 22a-c to the bridge 100. For example, the information 22a-c may be placed in the RTP header or the like for the sent audio 20a-c.

The bridge 100 has primary and secondary talker determination logic 135 as part of the mixer 105, which uses the speech flags and energy level information 22a-c from the endpoints 50a-c to determine the primary talker endpoint and the secondary talker endpoints. Then, the mixer 105 in the bridge 100 uses the speech flags and energy level information 22a-c along with the primary and secondary talker designations to decide which endpoints' audio is mixed in the conference audio.

At this point, the bridge 100 sends (relays) selected audio streams 30a-c to each endpoint 50a-c (i.e., sends audio from the other endpoints 50a-c to a given endpoint 50a-c without sending back the given endpoint's own audio). The bridge 100 also sends information 32a-c (primary and secondary talker designations, speech flag, and energy level) to all the endpoints 50a-c. Again, this information 32a-c may be placed in the RTP header or the like of the packets for the audio streams 30a-c.

The SVC receiving endpoints 50a-c receive the audio streams 30a-c and information 32a-c. Using the information 32a-c, the receiving endpoints 50a-c control the gain of the faders 145a-c and control the audio delay for the buffers 155a-c for the endpoints 50a-c according to the information 32a-c.

In addition to handling the speech detection for designating primary and secondary endpoints and to controlling faders and audio delay, the SVC endpoints 50a-c can perform some of the functions of the collision handler 190 discussed above related to identifying the formation of a speech collision between the detected speech of the endpoints 50a-c.

Accordingly, each of the SVC endpoints 50a-c can include components of the collision handler (190) with the speech-collision module (192) and the indication module (194) as described previously with reference to the bridge 100. The bridge 100 may in turn have collision logic 191 that compares flags and energy levels to detect a speech collision and returns information 32a-c for collision handling to the endpoints 50a-c. The handling and indication of the detected speech collision can then be handled by the appropriate components of the collision handler (190) that are part of the SVC endpoints 50a-c.

Figure 8B:
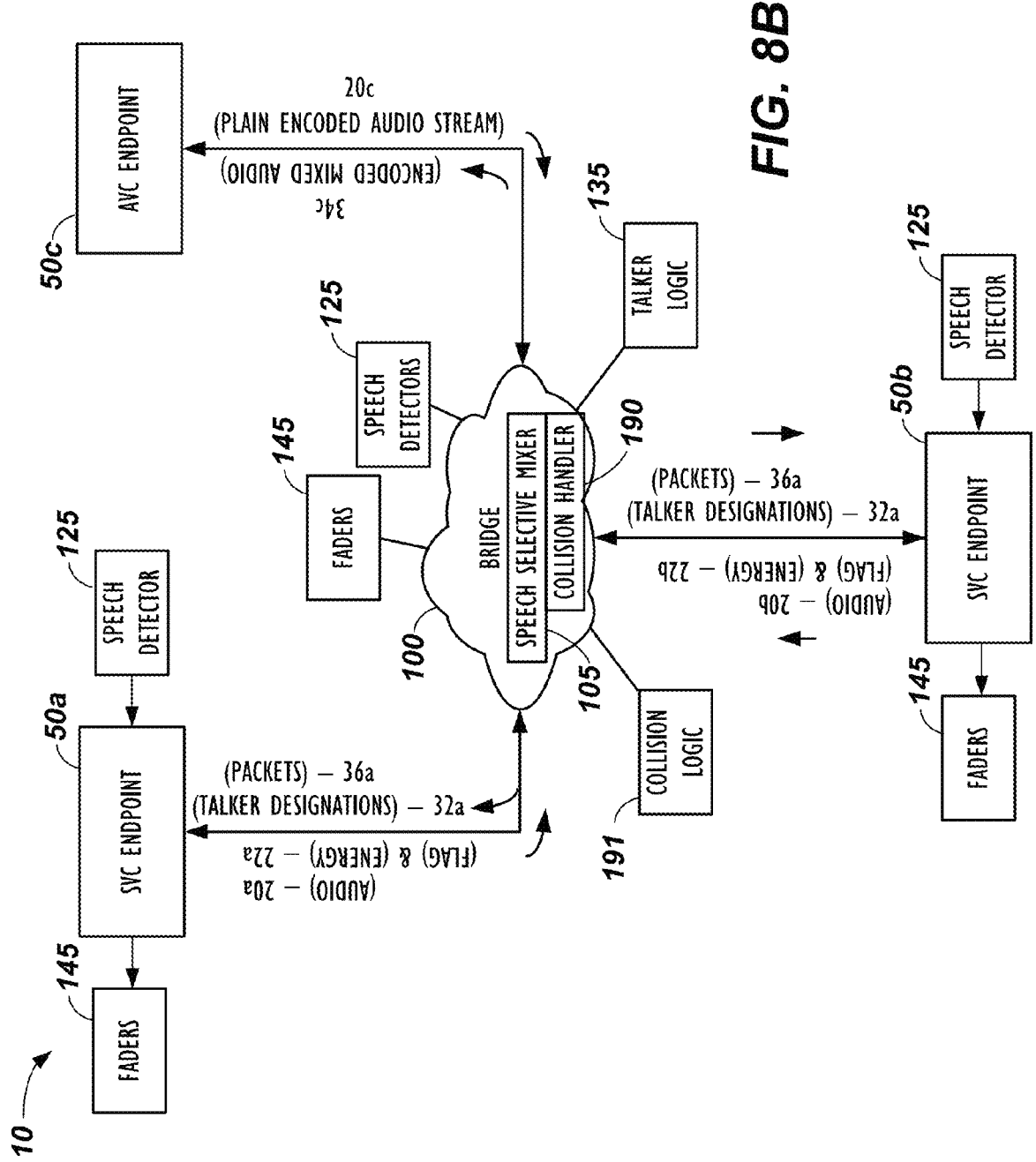

Details related to the conferencing system 10 in the SVC+AVC mixed mode are schematically shown in FIG. 8B. In the SVC+AVC mixed mode, processing and communication is a little more involved than in the SVC mode discussed previously because different endpoints may perform different processing.

For a transmitting SVC endpoint (e.g., 50a), its speech detector 125 detects speech/non-speech frames and energy level and sends audio 20a and a speech flag and energy level information 22a to the bridge 100. For a transmitting AVC endpoint (e.g., 50c), the AVC endpoint 50c simply sends its plain encoded audio stream 20c to the bridge 100.

The bridge 100 obtains the audio 20a and the speech flag and energy level information 22a from the SVC endpoints 50a and receives the plain audio 20c from the AVC endpoint 50c. Using the plain audio 20c from the AVC endpoint 50c, the bridge 100 determines the AVC endpoint's speech flag and energy level by running a speech/energy detector 125 of the bridge 100 on the decoded audio data.

The bridge 100 has primary and secondary talker determination logic 135 as part of the mixer 105, which uses the speech flags and energy levels from the endpoints 50a-c to determine the primary talker and secondary talker designations. Then, the mixer 105 in the bridge 100 uses the speech flags and energy levels along with the primary and secondary talker designations to decide which endpoints' audio is mixed in the conference audio.

The bridge 100 sends encoded final mixed audio 34c to the AVC endpoints 50c, where this final mixed audio has already been controlled by the faders 145 of the bridge 100. The AVC endpoints 50c can then perform as normal.

For the SVC endpoints 50a-b, by contrast, the bridge 100 creates scalable audio coding (SAC) packets and RTP header, which indicates which streams are for primary and secondary talkers, speech flags, and energy levels in the information 32a-b. The bridge 100 sends the SAC packets 36a-b and RTP header with information 32a-b. The receiving SVC endpoints 50a-b then use the information 32a-b (primary and secondary talker designations, speech flags, energy levels, etc.) and control the gain of faders 145a-c and audio delay of buffers 155 for the other endpoints 50a-c accordingly.

In addition to handling the speech detection for designating primary and secondary endpoints and to controlling faders and audio delay, the endpoints 50a-c and the bridge 100 can perform the functions of the collision handler (190) discussed above related to identifying the formation of a speech collision between the detected speech of the endpoints 50a-c. As noted above, the functionality of the collision handler (190), collision logic 191, collision detector (192A), collision controller (192B), analyzers (193), etc. can be arranged about the various endpoints 50a-c and the bridge 100 to handle speech collisions between the different endpoints 50a-c.

Figure 8C:
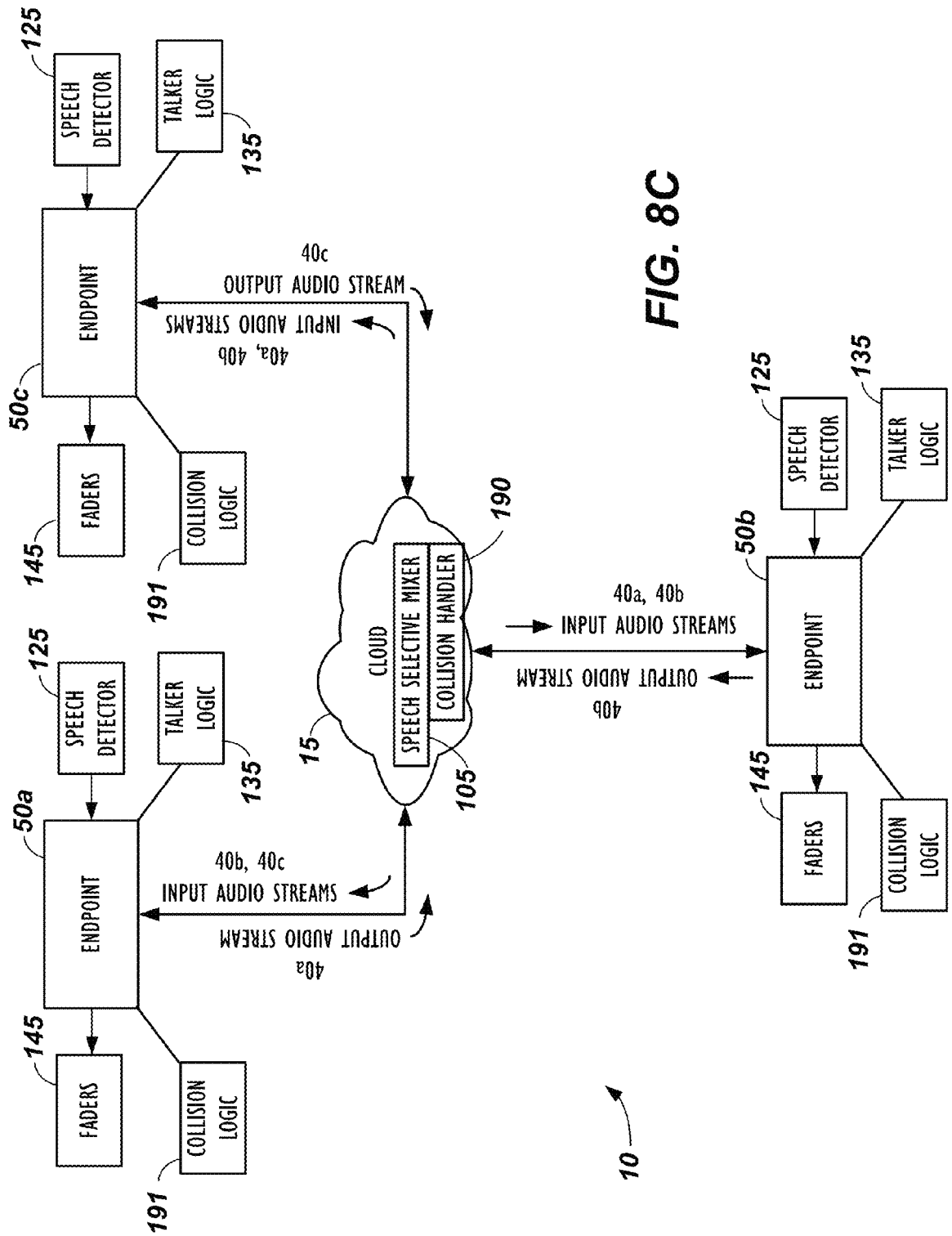

Details related to the conferencing system 10 in the bridgeless mode are schematically shown in FIG. 8C. In the bridgeless mode, the conferencing system 10 does not use a bridge and instead uses a one-to-many and many-to-one type peer-to-peer configuration.

Each endpoint 50a-c sends out its own audio stream 40a-c to the others via the network or cloud 15, and each endpoint 50a-c receives all of the other endpoint's audio streams 40a-c. On the receiving side, each endpoint 50a-c runs speech/energy detection with the speech detectors 125 on each of the received audio streams 40a-c. Then, each endpoint 50a-c determines the primary and secondary talker designations, speech detection, and energy levels of the endpoints 50a-c using talker logic 135. Finally, each endpoint 50a-c controls the gain of the faders 145a-c and the audio delay of the buffers 155a-c accordingly. In this arrangement, the speech selected mixer 105 is implemented across the peers (i.e., endpoints 50a-c) in the conference and is only schematically shown in the cloud 100 in FIG. 8C.

Finally, in addition to handling the speech detection for designating primary and secondary endpoints and to controlling faders and audio delay, the peer endpoints 50a-c can perform the functions of the collision handler (190) discussed above related to identifying the formation of a speech collision between the detected speech of the endpoints 50a-c. Accordingly, each of the peer endpoints 50a-c can include collision handling features of the speech-collision module (192), indication module (194), and the like as described previously with reference to the bridge. Communication about collisions can then be sent from each endpoint 50a-c to the others so the receiving endpoints 50a-c can generate the appropriate audio/visual indication of the speech collision. In other words, the interrupting endpoint 50a-c may need to generate its own indication of having interrupted another endpoint 50a-c in this peer-to-peer arrangement.

The foregoing description of preferred and other embodiments is not intended to limit or restrict the scope or applicability of the inventive concepts conceived of by the Applicant. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicant desires all patent rights afforded by the appended claims. Therefore, it is intended that the appended claims include all modifications and alterations to the full extent that they come within the scope of the following claims or the equivalents thereof.

What is claimed is:

1. A method for conducting a conference, comprising:
   buffering audio of each of a plurality of endpoints in the conference with an audio delay, whereby the endpoints have respective delay values for the audio delay;
   leveling the audio of each of the endpoints in the conference with a fader, whereby the endpoints have respective gain values for the fader;
   detecting speech in the audio of any one of the endpoints in the conference;
   controlling the respective delay value for the audio delay and the respective gain value for the fader for each of the endpoints based on the detection of the speech; and
   outputting a mix of the audio of the endpoints in the conference based on the control.

2. The method of claim 1, wherein the method comprises performing the acts of buffering, leveling, detecting, controlling, and outputting with a conferencing bridge in communication with the endpoints.

3. The method of claim 2, wherein the method comprises performing the acts of buffering, leveling, detecting, controlling, and outputting with one or more of the endpoints along with the conferencing bridge in communication with the endpoints.

4. The method of claim 1, wherein the method comprises performing the acts of buffering, leveling, detecting, controlling, and outputting with each of the endpoints.

5. The method of claim 1, wherein buffering the audio of each of the endpoints in the conference with the audio delay comprises designating write and read pointers of buffers for each of the endpoints.

6. The method of claim 1, wherein detecting speech in the audio of any one of the endpoints in the conference comprises determining that at least one of the endpoints is a primary endpoint having a primary talker.

7. The method of claim 6, wherein determining that the at least one of the endpoints is the primary endpoint having the primary talker comprises:
   determining energy levels of the detected speech of the any of the endpoints;
   determining which of the endpoints with the detected speech has a maximum of the energy levels; and
   designating the determined endpoint as the primary endpoint.

8. The method of claim 7, wherein determining which of the endpoints with the detected speech has the maximum energy level comprises maintaining a previous designation of the primary endpoint when the determined maximum does not at least meet a threshold.

9. The method of claim 6, wherein the step of controlling the respective delay value for the audio delay and the respective gain value for the fader comprises controlling the respective gain value of the fader for the primary endpoint in relation to the respective delay value of the audio delay for buffering of the primary endpoint.

10. The method of claim 9, wherein the step of controlling the respective gain value of the fader in relation to the respective delay value of the audio delay for the primary endpoint comprises:
    increasing the fader for the primary endpoint toward a maximum gain while setting the audio delay for buffering of the primary endpoint toward a maximum value.

11. The method of claim 10, wherein increasing the fader for the primary endpoint toward the maximum gain is done over a time interval.

12. The method of claim 10, wherein the step of controlling the respective gain value of the fader in relation to the respective delay value of the audio delay for the primary endpoint comprises:
    decreasing the audio delay for the primary endpoint toward a minimum value as long as the fader for the primary endpoint is toward a maximum gain and an energy level of the audio for the primary endpoint is below a threshold.

13. The method of claim 6, further comprising designating at least one of the other endpoints as a secondary endpoint.

14. The method of claim 13, wherein the step of controlling the respective delay value for the audio delay and the respective gain value for the fader comprises controlling the respective gain value of the fader for the secondary endpoint in relation to the respective delay value of the audio delay for buffering of the secondary endpoint.

15. The method of claim 14, wherein the step of controlling the respective gain value of the fader in relation to the respective delay value of the audio delay for the secondary endpoint comprises:
    decreasing the fader of the secondary endpoint toward a minimum gain as long as the audio of the secondary endpoint is not detected speech.

16. The method of claim 15, wherein decreasing the fader for the second endpoint toward the minimum gain is done over a time interval.

17. The method of claim 14, wherein the step of controlling the respective gain value of the fader in relation to the respective delay value of the audio delay for the secondary endpoint comprises:
    decreasing the fader of the secondary endpoint toward a minimum gain as long as the audio of the secondary endpoint is detected speech having an energy level below a threshold.

18. The method of claim 14, wherein the step of controlling the respective gain value of the fader in relation to the respective delay value of the audio delay for the secondary endpoint comprises:
    increasing the fader of the secondary endpoint toward a maximum gain as long as the audio of the secondary endpoint is detected speech having an energy level above a threshold.

19. The method of claim 14, wherein the step of controlling the respective gain value of the fader in relation to the respective delay value of the audio delay for the secondary endpoint comprises:
    decreasing the audio delay toward a minimum value for the secondary endpoint as long as the audio of the secondary endpoint is detected speech, the fader for the secondary endpoint is toward a maximum gain, and an energy level of the detected speech for the secondary endpoint is below a threshold.

20. The method of claim 1, wherein outputting the mix of the audio of the endpoints in the conference comprises mixing at an intermediate node between the endpoints, at the endpoints, or at a combination of the intermediate node and the endpoints.

21. The method of claim 1, wherein detecting the speech in the audio of any one of the endpoints in the conference comprises identifying a speech collision between at least two of the endpoints.

22. The method of claim 21, wherein controlling the audio delay and the fader for each of the endpoints based on the detection of the speech comprises managing the speech collision with minimal interruption to the conference.

23. The method of claim 21, wherein identifying the speech collision between the at least one endpoints comprises:
  determining audio energy of the audio for each of the endpoints; and
  monitoring the determined audio energy for the speech collision between the at least one endpoints.

24. The method of claim 23, wherein monitoring the determined audio energy for the speech collision between the at least one endpoints comprises determining a first increase in the audio energy for a first of the at least two endpoints occurring within a time interval of a second increase in the audio energy for a second of the at least two endpoints.

25. The method of claim 21, wherein identifying the speech collision between at least two of the endpoints comprises informing at least one of the at least two endpoints about the speech collision.

26. The method of claim 25, wherein informing the at least one endpoint about the speech collision comprises adding at least one of an audio indication and a visual indication of the speech collision to information for the at least one of the at least two endpoints.

27. The method of claim 25, further comprising adding the audio of the at least one endpoint to the mix for the conference.

28. The method of claim 27, wherein adding the audio of the at least one endpoint comprises increasing a gain of the fader for the at least one endpoint over a time interval.

29. The method of claim 21, wherein identifying the speech collision between the at least one endpoints comprises ignoring a break in the detected speech for a first of the at least two endpoints when interrupted by a second of the at least two endpoints.

30. A programmable storage device having program instructions for causing a programmable control device to perform a method for conducting a conference, the method comprising:
  buffering audio of each of a plurality of endpoints in the conference with an audio delay, whereby the endpoints have respective delay values for the audio delay;
  leveling the audio of each of the endpoints in the conference with a fader, whereby the endpoints have respective gains values for the fader;
  detecting speech in the audio of any one of the endpoints in the conference;
  controlling the respective delay value for the audio delay and the respective gain value for the fader for each of the endpoints based on the detection of the speech; and
  outputting a mix of the audio of the endpoints in the conference based on the control.

31. An apparatus for conducting a conference, comprising:
  communication equipment connecting a plurality of endpoints in the conference, the communication equipment sending and receiving audio; and
  memory having buffers for buffering the audio;
  processing equipment in communication with the communication equipment and the memory, the processing equipment configured to:
    buffer the audio in the buffers of each of the endpoints with an audio delay, whereby the endpoints have respective delay values for the audio delay;
    level the audio of each of the endpoints in the conference with a fader, whereby the endpoints have respective fade values for the fader;
    detect speech in the audio of any one of the endpoints;
    control the respective delay value for the audio delay and the respective fade value for the fader for each of the endpoints based on the detection of the speech; and
    output a mix of the audio of each of the endpoints in the conference based on the control.

32. The apparatus of claim 31, wherein one or more of the communication equipment, the memory, and the processing equipment comprise a part of a conferencing bridge in communication with the endpoints.

33. The apparatus of claim 31, wherein one or more of the communication equipment, the memory, and the processing equipment comprise a part of at least one of the endpoints.

\* \* \* \* \*